United States Patent
Huang et al.

(10) Patent No.: US 9,036,274 B2
(45) Date of Patent: May 19, 2015

(54) IMAGE CAPTURING OPTICAL LENS SYSTEM

(71) Applicant: LARGAN PRECISION CO., LTD., Taichung (TW)

(72) Inventors: Hsin-Hsuan Huang, Taichung (TW); Tsung-Han Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 104 days.

(21) Appl. No.: 13/655,490

(22) Filed: Oct. 19, 2012

(65) Prior Publication Data
US 2013/0314803 A1 Nov. 28, 2013

(30) Foreign Application Priority Data
May 28, 2012 (TW) .............................. 101118973 A

(51) Int. Cl.
*G02B 9/60* (2006.01)
*G02B 13/18* (2006.01)
*G02B 3/02* (2006.01)
*G02B 13/00* (2006.01)

(52) U.S. Cl.
CPC ................ *G02B 13/00* (2013.01); *G02B 13/18* (2013.01)

(58) Field of Classification Search
CPC .. G02B 9/60; G02B 13/0045; G02B 13/0075; G02B 13/18
USPC .......................................... 359/763, 764, 714
See application file for complete search history.

(56) References Cited

U.S. PATENT DOCUMENTS

| 7,502,181 B2 * | 3/2009 | Shinohara ...................... 359/764 |
| 2012/0087019 A1 | 4/2012 | Tang et al. |
| 2012/0188654 A1 * | 7/2012 | Huang ........................... 359/713 |

FOREIGN PATENT DOCUMENTS

| CN | 101046542 A | 10/2007 |
| CN | 101782676 A | 7/2010 |
| CN | 102023370 A | 4/2011 |
| CN | 202110325 U | 1/2012 |
| CN | 202149966 U | 2/2012 |
| JP | 2005265950 A | 9/2005 |
| JP | 2009-223251 A | 10/2009 |
| JP | 2009-294528 A | 12/2009 |
| JP | 2010-256608 A | 11/2010 |
| JP | 2010256608 A | 11/2010 |
| TW | 201215942 A1 | 4/2012 |
| TW | 201219884 A1 | 5/2012 |

* cited by examiner

Primary Examiner — Alicia M Harrington
(74) Attorney, Agent, or Firm — CKC & Partners Co., Ltd

(57) ABSTRACT

An image capturing optical lens system includes, in order from an object side to an image side, a first lens element, a second lens element, a third lens element, a fourth lens element and a fifth lens element. The first lens element with positive refractive power has a convex object-side surface. The second lens element has refractive power. The third lens element with positive refractive power has a convex image-side surface. The fourth lens element with negative refractive power has a concave object-side surface and a convex image-side surface, wherein the surfaces of the fourth lens element are aspheric. The fifth lens element with negative refractive power has a convex object-side surface and a concave image-side surface, wherein the surfaces of the fifth lens element are aspheric, and the fifth lens element has at least one inflection point on the image-side surface thereof.

26 Claims, 19 Drawing Sheets

IMAGE CAPTURING OPTICAL LENS SYSTEM

RELATED APPLICATIONS

The application claims priority to Taiwan Application Serial Number 10118973, filed May 28, 2012, which is herein incorporated by reference.

BACKGROUND

1. Technical Field

The present invention relates to an image capturing optical lens system. More particularly, the present invention relates to a compact image capturing optical lens system applicable to electronic products and three-dimensional (3D) image applications thereof.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens system such as the one disclosed in U.S. Pat. No. 7,869,142. Due to the popularity of mobile products with high-end specifications, such as smart phones and PDAs (Personal Digital Assistants), the requirements for high resolution and image quality of modern compact optical lens systems has been increasing significantly. However, the conventional four-element lens structure cannot satisfy these requirements of the compact optical lens system.

Although other conventional optical lens systems with five-element lens structure such as the ones disclosed in U.S. Pat. No. 8,000,030 enhance the image quality, the distribution of the refractive power of the fourth lens element and the fifth lens element cannot effectively reduce the back focal length of the optical lens system, so that it is hard to integrate the optical lens system to compact electronic products.

SUMMARY

According to one aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element has refractive power. The third lens element with positive refractive power has a convex image-side surface. The fourth lens element with negative refractive power has a concave object-side surface and a convex image-side surface, wherein the object-side surface and the image-side surface of the fourth lens element are aspheric. The fifth lens element with negative refractive power has a convex object-side surface and a concave image-side surface, wherein the object-side surface and the image-side surface of the fifth lens element are aspheric, and the fifth lens element has at least one inflection point on the image-side surface thereof. When a focal length of the first lens element is f1, a focal length of the third lens element is f3, a focal length of the fourth lens element is f4, a focal length of the fifth lens element is f5, a focal length of the image capturing optical lens system is f, and a curvature radius of the object-side surface of the second lens element is R3, the following relationships are satisfied:

$0 < f3/f1 \le 0.57$;

$0 < f4/f5 < 1.50$; and $-0.5 < f/R3 < 3.5$.

According to another aspect of the present disclosure, an image capturing optical lens system includes, in order from an object side to an image side, a first lens element, a second lens element, a third lens element, a fourth lens element and a fifth lens element. The first lens element with positive refractive power has a convex object-side surface. The second lens element has refractive power. The third lens element with positive refractive power has a convex image-side surface. The fourth lens element with negative refractive power has a concave object-side surface and a convex image-side surface, wherein the object-side surface and the image-side surface of the fourth lens element are aspheric. The fifth lens element with negative refractive power has a convex object-side surface and a concave image-side surface, wherein the object-side surface and the image-side surface of the fifth lens element are aspheric, and the fifth lens element has at least one inflection point on the image-side surface thereof. When a focal length of the first lens element is f1, a focal length of the third lens element is f3, a focal length of the fourth lens element is f4, a focal length of the fifth lens element is f5, a curvature radius of the image-side surface of the third lens element is R6, and a curvature radius of the object-side surface of the fourth lens element is R7, the following relationships are satisfied:

$0 < f3/f1 \le 0.57$;

$0 < f4/f5 < 1.50$; and $0 < R7/R6 < 0.90$.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
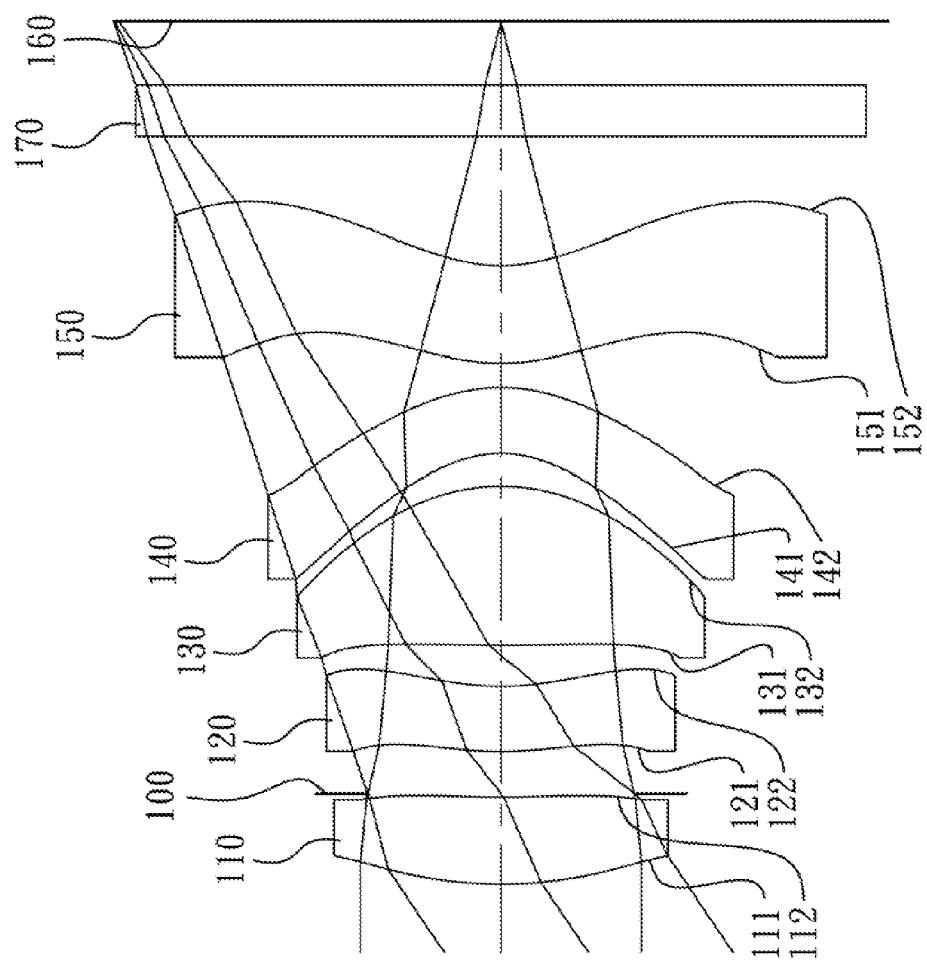
FIG. 1 is a schematic view of an image capturing optical lens system according to the 1st embodiment of the present disclosure.

An image capturing optical lens system includes, in order from an object side to an image side, a first lens element, a second lens element, a third lens element, a fourth lens element and a fifth lens element.

The first lens element with positive refractive power has a convex object-side surface and can have a concave image-side surface. Therefore, the total track length of the image capturing optical lens system can be reduced by properly adjusting the positive refractive power of the first lens element.

The second lens element can have a convex object-side surface and a concave image-side surface, so that the astigmatism of the image capturing optical lens system can be corrected. The image-side surface of the second lens element changes from concave near an optical axis to convex away from the optical axis, so that the angle at which the incident light projects onto an image sensor from the off-axis field can be effectively reduced, and the aberration of the off-axis field can be further corrected.

The third lens element with positive refractive power can balance the distribution of the positive refractive power of the first lens element, so that the spherical aberration generated from the first lens element with excessive refractive power can be avoided. The third lens element can have a convex image-side surface, so that the sensitivity of the image capturing optical lens system can be reduced.

The fourth lens element has negative refractive power, so that the principal point of the image capturing optical lens system can be positioned away from the image plane, and the back focal length of the image capturing optical lens system can be reduced. The fourth lens element has a concave object-side surface and a convex image-side surface, so that the astigmatism of the image capturing optical lens system can be corrected effectively.

The fifth lens element with negative refractive power has a convex object-side surface and a concave image-side surface, so that the principal point of the image capturing optical lens system can be positioned away from the image plane and the back focal length of the image capturing optical lens system can be reduced by combining with the negative refractive power of the fourth lens element so as to maintain the compact size of the image capturing optical lens system. Furthermore, the object-side surface of the fifth lens element changes from convex near the optical axis to concave away from the optical axis, and the fifth lens element has at least one inflection point on the image-side surface. Therefore, the angle at which the incident light projects onto an image sensor from the off-axis field can be effectively reduced, and the aberration of the off-axis field can be further corrected.

When a focal length of the first lens element is f1, and a focal length of the third lens element is f3, the following relationship is satisfied:

$0 < f3/f1 \le 0.57$.

Therefore, the distribution of the positive refractive power of the first lens element and the third lens element can be balanced, so that the sensitivity of the image capturing optical lens system can be reduced effectively.

f1 and f3 can further satisfy the following relationship:

$0 < f3/f1 < 0.45$.

Moreover, f1 and f3 can satisfy the following relationship:

$0 < f3/f1 < 0.35$.

When a focal length of the fourth lens element is f4, and a focal length of the fifth lens element is f5, the following relationship is satisfied:

$0 < f4/f5 < 1.50$.

Therefore, the distribution of the negative refractive power of the fourth lens element and the fifth lens element can be balanced, so that the principal point of the image capturing optical lens system can be positioned away from the image plane, and the back focal length of the image capturing optical lens system can be further reduced.

f4 and f5 can further satisfy the following relationship:

$0 < f4/f5 < 0.70$.

When a focal length of the image capturing optical lens system is f, and a curvature radius of the object-side surface of the second lens element is R3, the following relationship is satisfied:

$-0.5 < f/R3 < 3.5$.

Therefore, the aberration of the image capturing optical lens system can be corrected by properly adjusting the curvature of the image-side surface of the second lens element.

When a curvature radius of the image-side surface of the third lens element is R6, and a curvature radius of the object-side surface of the fourth lens element is R7, the following relationship is satisfied:

$0 < R7/R6 < 0.90$.

Therefore, the curvature of the image-side surface of the third lens element and the object-side surface of the fourth lens element can be properly adjusted, so that the aberration of the image capturing optical lens system can be reduced while enhancing the resolving power thereof.

When a sum of the central thickness from the first through fifth lens elements is ΣCT, and an axial distance between the object-side surface of the first lens element and the image-side surface of the fifth lens element is Td, the following relationship is satisfied:

$$0.70 < \Sigma CT/Td < 0.90.$$

Therefore, the arrangement of the thickness of the lens elements is favorable for reducing the total track length of the image capturing optical lens system so as to maintain the compact size thereof.

ΣCT and Td can further satisfy the following relationship:

$$0.75 < \Sigma CT/Td < 0.85.$$

When a curvature radius of the object-side surface of the fifth lens element is R9, and the focal length of the image capturing optical lens system is f, the following relationship is satisfied:

$$0.20 < R9/f < 0.60.$$

Therefore, the Petzval sum of the image capturing optical lens system can be corrected for smoothing the peripheral region of the image, and the resolving power can be further enhanced and the aberration can be also corrected.

When the focal length of the image capturing optical lens system is f, and an entrance pupil diameter of the image capturing optical lens system is EPD, the following relationship is satisfied:

$$1.2 < f/EPD \leq 2.2.$$

Therefore, the image capturing optical lens system can obtain the characteristic of a large aperture for retaining high image quality under insufficient lighting conditions.

When the curvature radius of the object-side surface of the fourth lens element is R7, a curvature radius of the image-side surface of the fourth lens element is R8, the curvature radius of the object-side surface of the fifth lens element is R9 and a curvature radius of the image-side surface of the fifth lens element is R10, the following relationship is satisfied:

$$0.20 < |(R7-R8)/(R7+R8)| + |(R9-R10)/(R9+R10)| < 0.45.$$

Therefore, the high-order aberration of the image capturing optical lens system can be reduced by adjusting the curvature of the surfaces of the fourth lens element and the fifth lens element.

When an Abbe number of the second lens element is V2, and an Abbe number of the fourth lens element is V4, the following relationship is satisfied:

$$20 < (V2+V4)/2 < 30.$$

Therefore, the chromatic of the image capturing optical lens system can be reduced.

When the focal length of the first lens element is f1, the focal length of the third lens element is f3, the focal length of the fifth lens element is f5, and the focal length of the image capturing optical lens system is f, the following relationship is satisfied:

$$0.20 < (f/f1 - f/f5)/(f/f3) < 075.$$

Therefore, the distribution of the positive refractive power among the first, third, and fifth lens elements can be balanced, so that the total track length of the image capturing optical lens system can be reduced without generating significant aberrations.

When a distance between an optical axis and a non-axial critical point on the image-side surface of the fifth lens element is Yc1, and a central thickness of the third lens element is CT3, the following relationship is satisfied:

$$1.0 < Yc52/CT3 < 3.5.$$

Therefore, the angle at which the incident light projects onto an image sensor from the off-axis field can be effectively reduced, and the aberration of the off-axis field can be further corrected.

When a curvature radius of the object-side surface of the third lens element is R5, and a curvature radius of the image-side surface of the third lens element is R6, the following relationship is satisfied:

$$0.3 < (R5+R6)/(R5-R6) < 1.3.$$

Therefore, the spherical aberration generated from the first lens element with excessive power refractive power can be avoided by properly adjusting the positive refractive power of the third lens element.

When a central thickness of the fourth lens element is CT4, and a central thickness of the fifth lens element is CT5, the following relationship is satisfied:

$$0.8 < CT5/CT4 < 1.8.$$

Therefore, the manufacture of the lens elements and the assembling of the image capturing optical lens system would be easier by the proper thickness of the fourth lens element and the fifth lens element.

When an axial distance between the first lens element and the second lens element is T12, and a central thickness of the second lens element is CT2, the following relationship is satisfied:

$$0 < T12/CT2 < 1.0.$$

Therefore, the distance between the lens elements and the thickness of the second lens element are favorable for fabricating the image capturing optical lens system and maintaining the compact size thereof.

According to the image capturing optical lens system of the present disclosure, the lens elements thereof can be made of glass or plastic material. When the lens elements are made of glass material, the distribution of the refractive power of the image capturing optical lens system may be more flexible to design. When the lens elements are made of plastic material, the manufacturing costs can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image capturing optical lens system can also be reduced.

According to the image capturing optical lens system of the present disclosure, when the lens element has a convex surface, it indicates that the paraxial region of the surface is convex; and when the lens element has a concave surface, it indicates that the paraxial region of the surface is concave.

According to the image capturing optical lens system of the present disclosure, the image capturing optical lens system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer and less angular light travel from an exit pupil of the system to an image plane and thereby the generated telecentric effect improves the image-sensing efficiency of an image sensor. A middle stop which can be disposed anywhere between the first lens element and the image plane is favorable for enlarging the field of view of the system and thereby provides a wider view angle for the same.

According to the above description of the present disclosure, the following 1st-9th specific embodiments are provided for further explanation.

1st Embodiment

Figure 2:
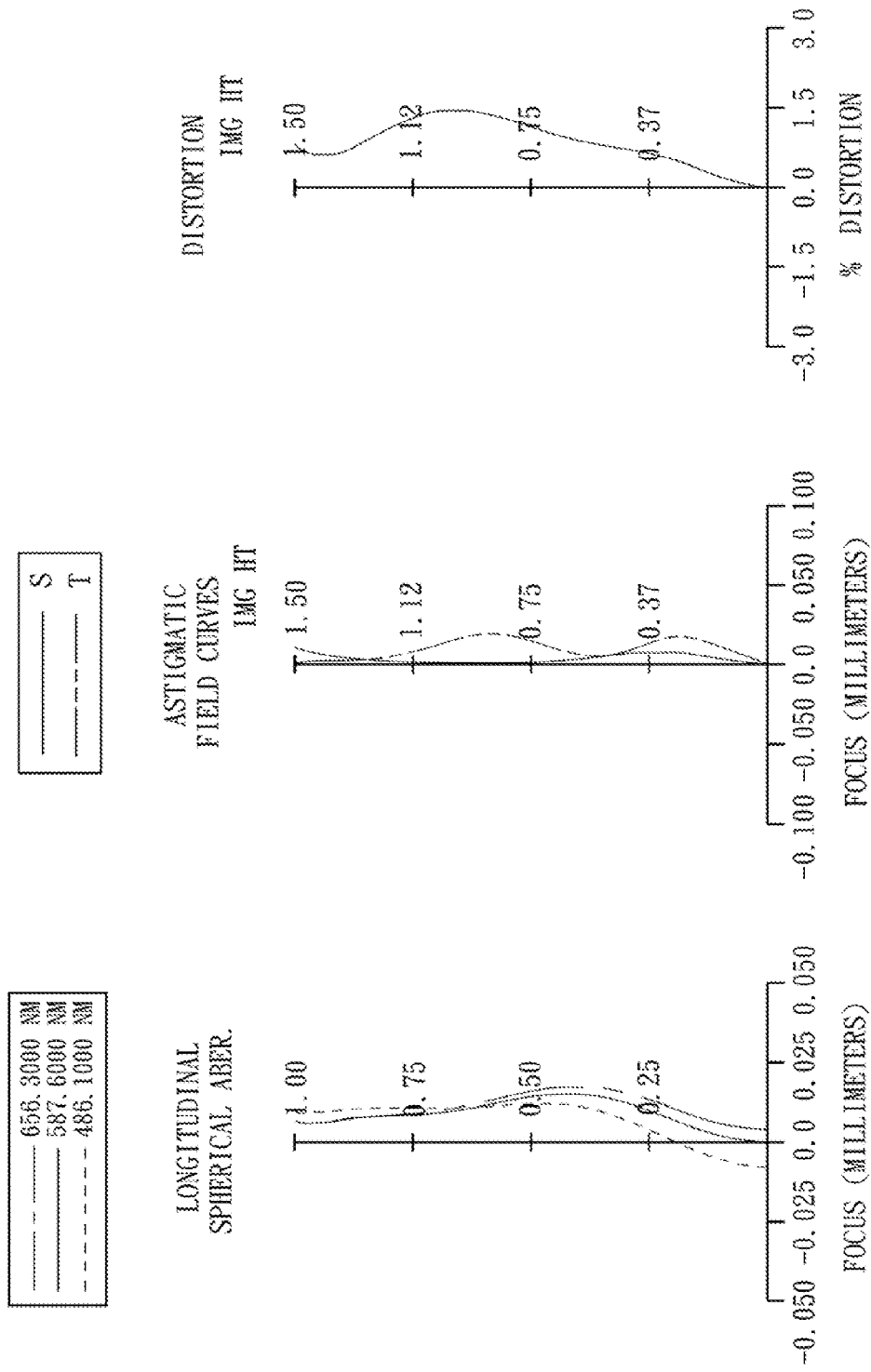
FIG. 2 shows spherical aberration curves, astigmatic field curves and a distortion curve of the image capturing optical lens system according to the 1st embodiment.

FIG. 1 is a schematic view of an image capturing optical lens system according to the 1st embodiment of the present disclosure. FIG. 2 shows spherical aberration curves, astigmatic field curves and a distortion curve of the image capturing optical lens system according to the 1st embodiment. In FIG. 1, the image capturing optical lens system includes, in order from an object side to an image side, a first lens element 110, an aperture stop 100, a second lens element 120, a third lens element 130, a fourth lens element 140, a fifth lens element 150, an IR-cut filter 170 and an image plane 160.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with negative refractive power has a convex object-side surface 121 and a concave image-side surface 122, wherein the image-side surface 122 of the second lens element 120 changes from concave near an optical axis to convex away from the optical axis. The second lens element 120 is made of plastic material and has the object-side surface 121 and the image-side surface 122 being aspheric.

The third lens element 130 with positive refractive power has a convex object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with negative refractive power has a convex object-side surface 151 and a concave image-side surface 152, wherein the object-side surface 151 of the fifth lens element 150 changes from convex near the optical axis to concave away from the optical axis, and the fifth lens element 150 has inflection points on the image-side surface 152 thereof. The fifth lens element 150 is made of plastic material and has the object-side surface 151 and the image-side surface 152 being aspheric.

The IR-cut filter 170 is made of glass, and located between the fifth lens element 150 and the image plane 160, and will not affect the focal length of the image capturing optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical lens system according to the 1st embodiment, when a focal length of the image capturing optical lens system is f, an f-number of the image capturing optical lens system is Fno, and half of the maximal field of view of the image capturing optical lens system is HFOV, these parameters have the following values:

f=2.18 mm;

Fno=2.00; and

HFOV=34.2 degrees.

In the image capturing optical lens system according to the 1st embodiment, when an Abbe number of the second lens element 120 is V2, and an Abbe number of the fourth lens element 140 is V4, the following relationship is satisfied:

$(V2+V4)/2=23.30.$

In the image capturing optical lens system according to the 1st embodiment, when an axial distance between the first lens element 110 and the second lens element 120 is T12, a central thickness of the second lens element 120 is CT2, a central thickness of the fourth lens element 140 is CT4, and a central thickness of the fifth lens element 150 is CT5, the following relationships are satisfied:

$T12/CT2=0.71$; and $CT5/CT4=1.47.$

In the image capturing optical lens system according to the 1st embodiment, when a sum of the central thickness from the first through fifth lens elements (110-150) is ΣCT, and an axial distance between the object-side surface 111 of the first lens element 110 and the image-side surface 152 of the fifth lens element 150 is Td, the following relationship is satisfied:

$\Sigma CT/Td=0.77.$

In the image capturing optical lens system according to the 1st embodiment, when the focal length of the image capturing optical lens system is f, and a curvature radius of the object-side surface 121 of the second lens element 120 is R3, the following relationship is satisfied:

$f/R3=1.49.$

In the image capturing optical lens system according to the 1st embodiment, when a curvature radius of the object-side surface 131 of the third lens element 130 is R5, a curvature radius of the image-side surface 132 of the third lens element 130 is R6, and a curvature radius of the object-side surface 141 of the fourth lens element 140 is R7, the following relationships are satisfied:

$(R5+R6)/(R5-R6)=0.84$; and $R7/R6=0.58.$

In the image capturing optical lens system according to the 1st embodiment, when the curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, and a curvature radius of the image-side surface 152 of the fifth lens element 150 is R10, the following relationship is satisfied:

$|(R7-R8)/(R7+R8)|+|(R9-R10)/(R9+R10)|=0.34.$

In the image capturing optical lens system according to the 1st embodiment, when the curvature radius of the object-side surface 151 of the fifth lens element 150 is R9, and the focal length of the image capturing optical lens system is f, the following relationship is satisfied:

$R9/f=0.38$.

In the image capturing optical lens system according to the 1st embodiment, when a focal length of the first lens element 110 is f1, a focal length of the third lens element 130 is f3, a focal length of the fourth lens element 140 is f4, a focal length of the fifth lens element 150 is f5, and the focal length of the image capturing optical lens system is f, the following relationships are satisfied:

$f3/f1=0.31$;

$f4/f5=0.19$; and $(f/f1-f/f5)/(f/f3)=0.38$.

In the image capturing optical lens system according to the 1st embodiment, when the focal length of the image capturing optical lens system is f, and an entrance pupil diameter of the image capturing optical lens system is EPD, the following relationship is satisfied:

$f/EPD=2.00$.

Figure 19:
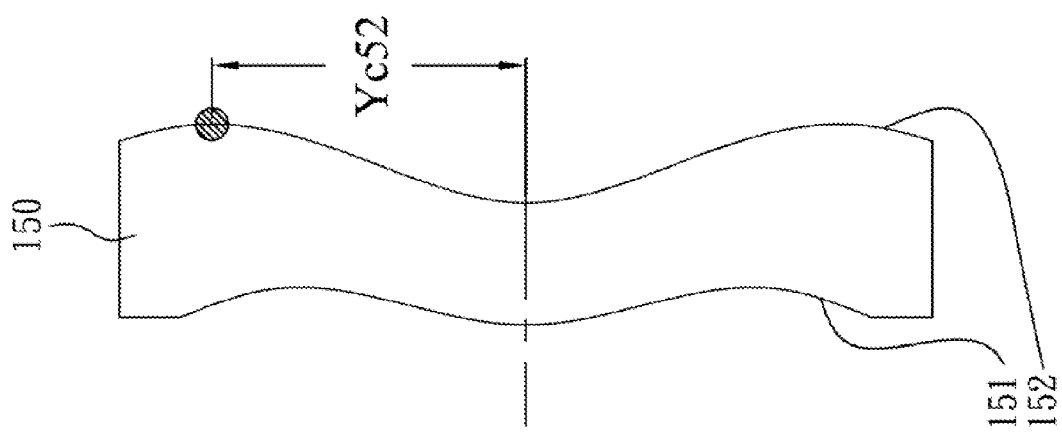
FIG. 19 shows the distance Yc1 between an optical axis and a non-axial critical point on the image-side surface of the fifth lens element of FIG. 1.

FIG. 19 shows Yc1 of the fifth lens element 150 of FIG. 1. In FIG. 19, when a distance between an optical axis and a non-axial critical point on the image-side surface 152 of the fifth lens element 150 is Yc1, and a central thickness of the third lens element 130 is CT3, the following relationship is satisfied:

$Yc52/CT3=1.58$.

The detailed optical data of the 1st embodiment are shown in Table 1 and the aspheric surface data are shown in Table 2 below.

TABLE 1

1st Embodiment
f = 2.18 mm, Fno = 2.00, HFOV = 34.2 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Lens 1 | 1.609 | (ASP) | 0.340 | Plastic | 1.544 | 55.9 | 4.24 |
| 2 | | 4.912 | (ASP) | 0.013 | | | | |
| 3 | Ape. Stop | Plano | | 0.164 | | | | |
| 4 | Lens 2 | 1.457 | (ASP) | 0.250 | Plastic | 1.640 | 23.3 | −7.89 |
| 5 | | 1.055 | (ASP) | 0.162 | | | | |
| 6 | Lens 3 | 8.802 | (ASP) | 0.616 | Plastic | 1.544 | 55.9 | 1.32 |
| 7 | | −0.760 | (ASP) | 0.126 | | | | |
| 8 | Lens 4 | −0.439 | (ASP) | 0.257 | Plastic | 1.640 | 23.3 | −3.42 |
| 9 | | −0.675 | (ASP) | 0.094 | | | | |
| 10 | Lens 5 | 0.830 | (ASP) | 0.379 | Plastic | 1.544 | 55.9 | −18.07 |
| 11 | | 0.642 | (ASP) | 0.500 | | | | |
| 12 | IR-cut filter | Plano | | 0.200 | Glass | 1.517 | 64.2 | — |
| 13 | | Plano | | 0.245 | | | | |
| 14 | Image | Plano | | — | | | | |

Note:
Reference wavelength (d-line) is 587.6 nm.

TABLE 2

Aspheric Coefficients

| Surface # | 1 | 2 | 4 | 5 | 6 |
|---|---|---|---|---|---|
| k = | −1.2875E+00 | −2.0000E+01 | −1.2559E+01 | −3.2004E+00 | 2.9860E+00 |
| A4 = | −5.4269E−02 | −5.6424E−01 | −7.4566E−01 | −7.4379E−01 | −1.6656E−01 |
| A6 = | 3.0281E−01 | 7.1024E−01 | −4.2478E−01 | 2.0183E−01 | −2.0992E−01 |
| A8 = | −1.9318E+00 | 3.2871E−03 | 2.5973E+00 | 8.0073E−01 | −8.8117E−01 |
| A10 = | 4.7118E+00 | −5.1675E+00 | −5.2031E+00 | −1.1447E+00 | 1.9848E+00 |
| A12 = | −6.0687E+00 | 6.6674E+00 | 9.2935E−01 | −2.3008E+00 | 2.8112E+00 |
| A14 = | 8.5520E−02 | −1.2288E−01 | 7.8495E−02 | 1.0604E+00 | −7.9038E+00 |
| A16 = | | | | | −1.8180E+00 |

| Surface # | 7 | 8 | 9 | 10 | 11 |
|---|---|---|---|---|---|
| k = | −5.9868E−01 | −2.3557E+00 | −8.6486E−01 | −6.0725E+00 | −3.7544E+00 |
| A4 = | 5.4469E−02 | −2.2674E−01 | 5.8943E−01 | −2.9264E−01 | −2.1640E−01 |
| A6 = | 1.4914E−01 | −1.2666E−01 | −6.2547E−01 | −3.4205E−03 | 6.8169E−02 |
| A8 = | −4.1067E−01 | 1.0797E+00 | 2.8591E−01 | −2.6242E−04 | −2.4778E−02 |
| A10 = | −7.4268E−02 | −2.0186E+00 | 2.2271E−01 | 4.5147E−02 | 9.3929E−03 |
| A12 = | 1.9487E+00 | 7.0654E−01 | −1.8452E−01 | −8.6502E−03 | −5.6000E−03 |
| A14 = | −1.7428E+00 | 2.0299E+00 | −1.0034E−01 | 3.8728E−03 | 2.2867E−03 |
| A16 = | | −1.1290E+00 | 2.3705E−01 | −1.4254E−03 | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
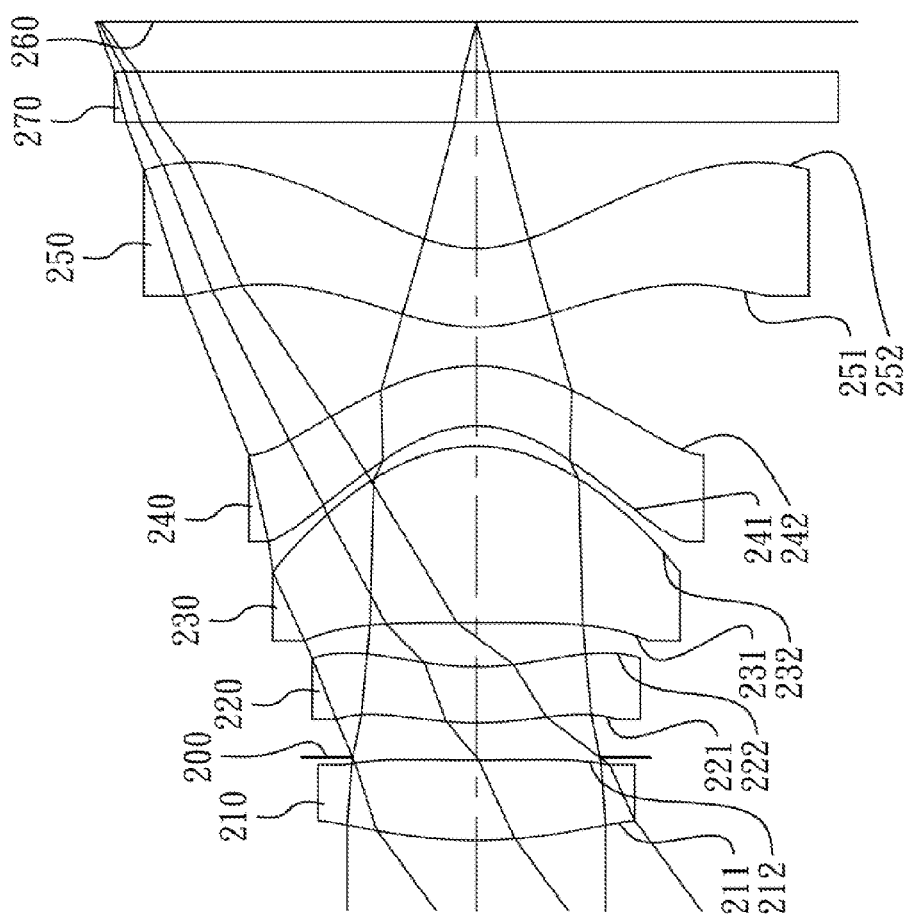
FIG. 3 is a schematic view of an image capturing optical lens system according to the 2nd embodiment of the present disclosure.
Figure 4:
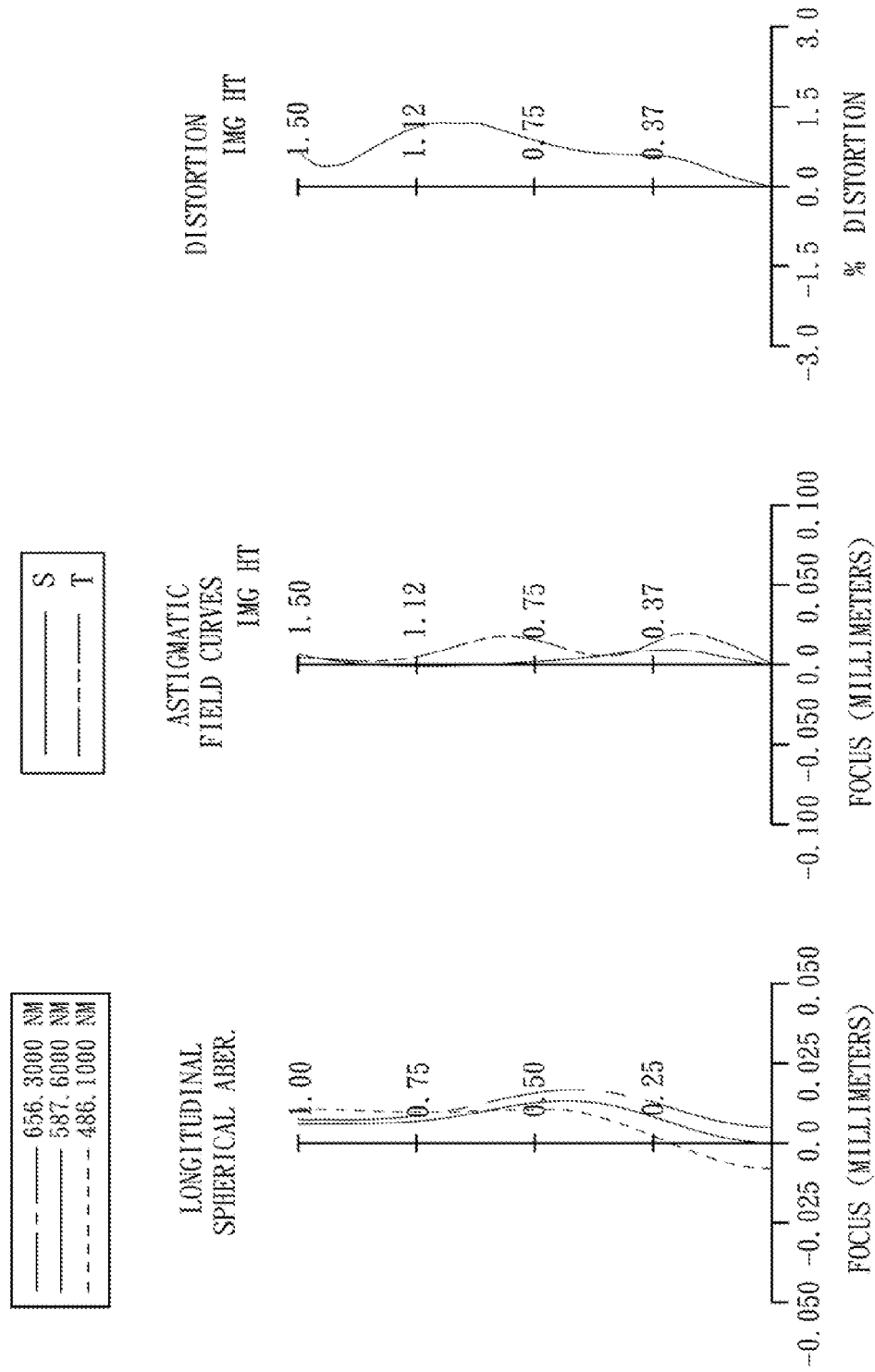
FIG. 4 shows spherical aberration curves, astigmatic field curves and a distortion curve of the image capturing optical lens system according to the 2nd embodiment.

FIG. 3 is a schematic view of an image capturing optical lens system according to the 2nd embodiment of the present disclosure. FIG. 4 shows spherical aberration curves, astigmatic field curves and a distortion curve of the image capturing optical lens system according to the 2nd embodiment. In FIG. 3, the image capturing optical lens system includes, in order from an object side to an image side, a first lens element 210, an aperture stop 200, a second lens element 220, a third lens element 230, a fourth lens element 240, a fifth lens element 250, an IR-cut filter 270 and an image plane 260.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with negative refractive power has a convex object-side surface 221 and a concave image-side surface 222, wherein the image-side surface 222 of the second lens element 220 changes from concave near an optical axis to convex away from the optical axis. The second lens element 220 is made of plastic material and has the object-side surface 221 and the image-side surface 222 being aspheric.

The third lens element 230 with positive refractive power has a concave object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with negative refractive power has a convex object-side surface 251 and a concave image-side surface 252, wherein the object-side surface 251 of the fifth lens element 250 changes from convex near the optical axis to concave away from the optical axis, and the fifth lens element 250 has inflection points on the image-side surface 252 thereof. The fifth lens element 250 is made of plastic material and has the object-side surface 251 and the image-side surface 252 being aspheric.

The IR-cut filter 270 is made of glass, and located between the fifth lens element 250 and the image plane 260, and will not affect the focal length of the image capturing optical lens system.

The detailed optical data of the 2nd embodiment are shown in Table 3 and the aspheric surface data are shown in Table 4 below.

TABLE 3

2nd Embodiment
f = 2.00 mm, Fno = 1.95, HFOV = 36.6 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Lens 1 | 1.946 | (ASP) | 0.319 | Plastic | 1.544 | 55.9 | 4.94 |
| 2 | | 6.644 | (ASP) | 0.011 | | | | |
| 3 | Ape. Stop | Plano | | 0.138 | | | | |
| 4 | Lens 2 | 1.300 | (ASP) | 0.220 | Plastic | 1.650 | 21.4 | −37.37 |
| 5 | | 1.152 | (ASP) | 0.177 | | | | |
| 6 | Lens 3 | −36.557 | (ASP) | 0.697 | Plastic | 1.544 | 55.9 | 1.19 |
| 7 | | −0.638 | (ASP) | 0.081 | | | | |
| 8 | Lens 4 | −0.433 | (ASP) | 0.240 | Plastic | 1.650 | 21.4 | −3.17 |
| 9 | | −0.667 | (ASP) | 0.152 | | | | |
| 10 | Lens 5 | 0.710 | (ASP) | 0.314 | Plastic | 1.544 | 55.9 | −8.57 |
| 11 | | 0.520 | (ASP) | 0.500 | | | | |
| 12 | IR-cut filter | Plano | | 0.200 | Glass | 1.517 | 64.2 | — |
| 13 | | Plano | | 0.196 | | | | |
| 14 | Image | Plano | | — | | | | |

Note:
Reference wavelength (d-line) is 587.6 nm.

TABLE 4

Aspheric Coefficients

| Surface # | 1 | 2 | 4 | 5 | 6 |
|---|---|---|---|---|---|
| k = | −1.7405E+00 | −1.5937E+01 | −1.0439E+01 | −2.8899E+00 | −2.0000E+01 |
| A4 = | −6.5780E−02 | −6.7099E−01 | −6.8261E−01 | −7.5765E−01 | −1.8278E−01 |
| A6 = | 2.8078E−01 | 1.2000E+00 | −5.5212E−01 | −8.4276E−02 | −2.4017E−01 |
| A8 = | −1.8591E+00 | −1.6537E+00 | 1.6380E+00 | 7.7690E−01 | −1.0705E+00 |
| A10 = | 4.2533E+00 | −3.2367E+00 | −3.9696E+00 | −3.3446E−02 | 2.8154E+00 |
| A12 = | −6.0522E+00 | 6.5976E+00 | 1.0850E+00 | −2.3421E+00 | 2.7789E+00 |
| A14 = | 8.1114E−02 | −1.4520E−01 | 1.5401E−01 | 9.7944E−01 | −7.9853E+00 |

TABLE 4-continued

| Aspheric Coefficients | | | | | |
|---|---|---|---|---|---|
| A16 = | | | | | −1.9312E+00 |

| Surface # | 7 | 8 | 9 | 10 | 11 |
|---|---|---|---|---|---|
| k = | −7.2256E−01 | −2.1607E+00 | −8.9597E−01 | −4.7903E+00 | −3.1116E+00 |
| A4 = | 2.0621E−01 | −1.3167E−01 | 6.2449E−01 | −2.4986E−01 | −2.1130E−01 |
| A6 = | 5.9999E−02 | −7.1336E−02 | −5.8496E−01 | 1.3591E−02 | 8.7908E−02 |
| A8 = | −3.6809E−01 | 1.0755E+00 | 3.1512E−01 | 1.4815E−02 | −3.1716E−02 |
| A10 = | −4.9927E−02 | −1.8725E+00 | 2.2640E−01 | 3.7187E−02 | 9.0786E−03 |
| A12 = | 1.7225E+00 | 1.0560E+00 | −1.5103E−01 | −1.9278E−02 | −5.7992E−03 |
| A14 = | −1.5303E+00 | 1.8386E+00 | −3.5801E−02 | −3.1811E−03 | 2.0718E−03 |
| A16 = | | −1.8122E+00 | 1.1147E−01 | 3.0885E−03 | |

In the image capturing optical lens system according to the 2nd embodiment, the definitions of f, Fno, HFOV, V2, V4, T12, CT2, CT3, CT4, CT5, ΣCT, Td, R3, R5, R6, R7, R8, R9, R10, f1, f3, f4, f5, EPD and Yc1 are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 2.00 | R7/R6 | 0.68 |
| Fno | 1.95 | \|(R7 − R3)/(R7 + R8)\| + \|(R9 − R10)/(R9 + R10)\| | 0.37 |
| HFOV (deg.) | 36.6 | R9/f | 0.36 |
| (V2 + V4)/2 | 21.40 | f3/f1 | 0.24 |
| T12/CT2 | 0.68 | f4/f5 | 0.37 |
| CT5/CT4 | 1.31 | (f/f1 − f/f5)/(f/f3) | 0.38 |
| ΣCT/Td | 0.76 | f/EPD | 1.95 |
| f/R3 | 1.53 | Yc52/CT3 | 1.59 |
| (R5 + R6)/(R5 − R6) | 1.04 | | |

3rd Embodiment

Figure 5:
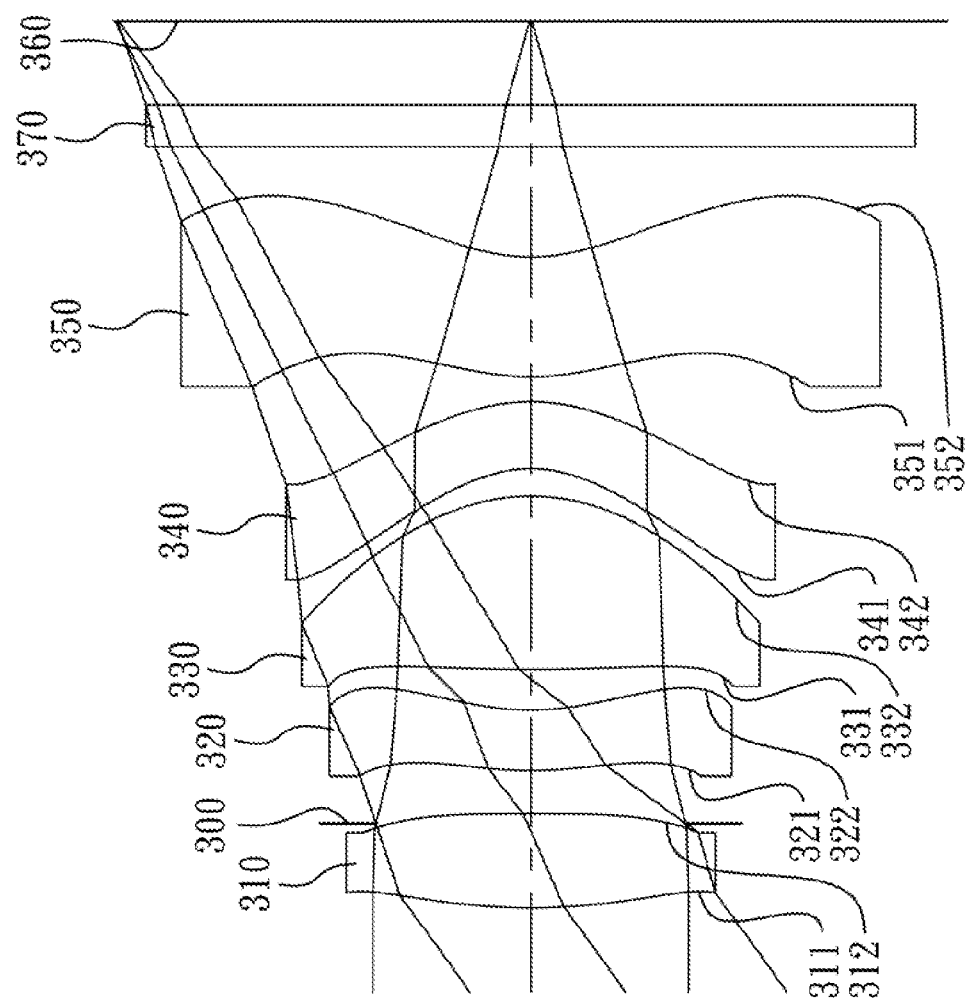
FIG. 5 is a schematic view of an image capturing optical lens system according to the 3rd embodiment of the present disclosure.
Figure 6:
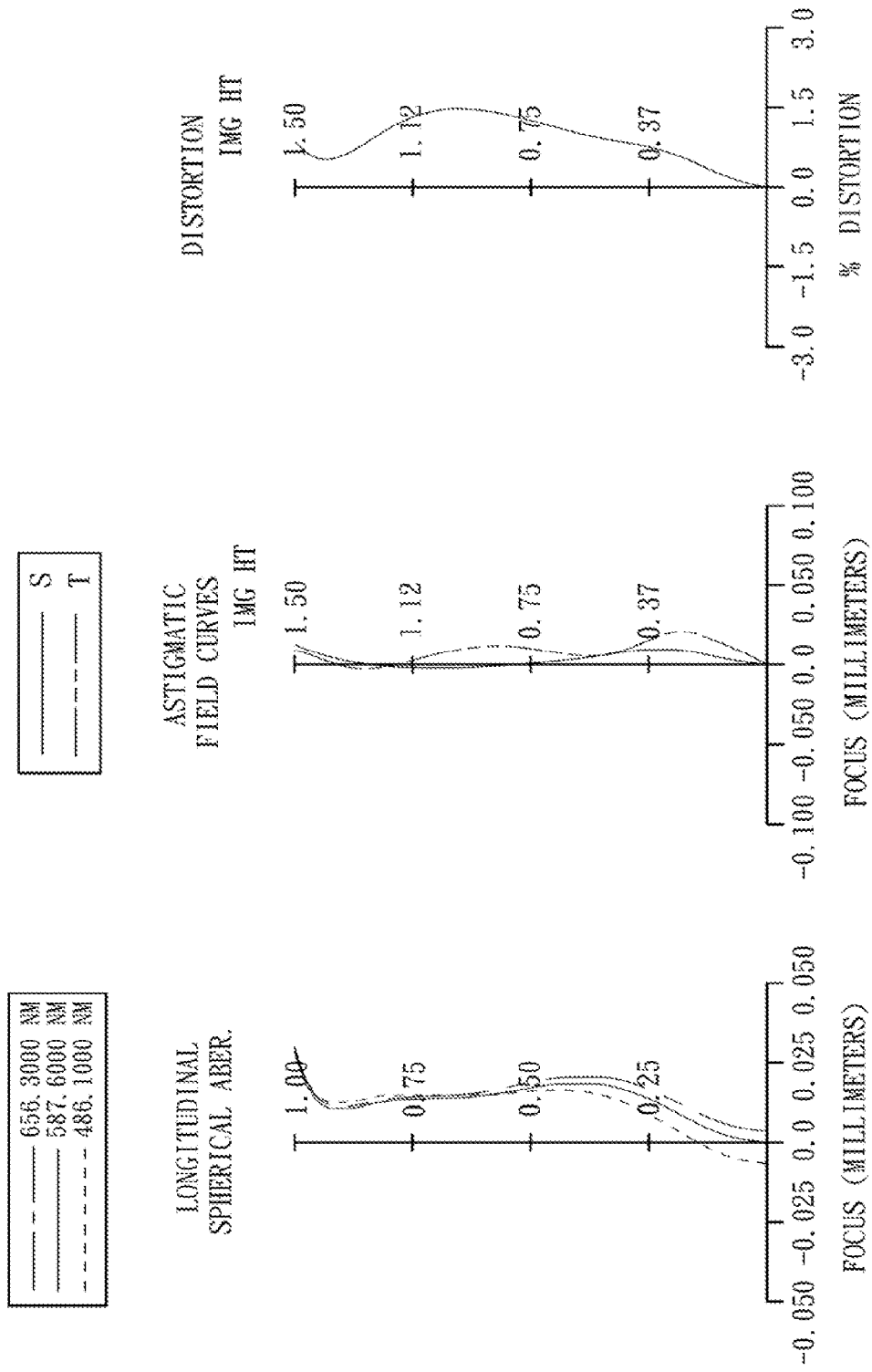
FIG. 6 shows spherical aberration curves, astigmatic field curves and a distortion curve of the image capturing optical lens system according to the 3rd embodiment.

FIG. 5 is a schematic view of an image capturing optical lens system according to the 3rd embodiment of the present disclosure. FIG. 6 shows spherical aberration curves, astigmatic field curves and a distortion curve of the image capturing optical lens system according to the 3rd embodiment. In FIG. 5, the image capturing optical lens system includes, in order from an object side to an image side, a first lens element 310, an aperture stop 300, a second lens element 320, a third lens element 330, a fourth lens element 340, a fifth lens element 350, an IR-cut filter 370 and an image plane 360.

The first lens element 310 with positive refractive power has a convex object-side surface 311 and a convex image-side surface 312. The first lens element 310 is made of plastic material and has the object-side surface 311 and the image-side surface 312 being aspheric.

The second lens element 320 with negative refractive power has a convex object-side surface 321 and a concave image-side surface 322, wherein the image-side surface 322 of the second lens element 320 changes from concave near an optical axis to convex away from the optical axis. The second lens element 320 is made of plastic material and has the object-side surface 321 and the image-side surface 322 being aspheric.

The third lens element 330 with positive refractive power has a convex object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with negative refractive power has a convex object-side surface 351 and a concave image-side surface 352, wherein the object-side surface 351 of the fifth lens element 350 changes from convex near the optical axis to concave away from the optical axis, and the fifth lens element 350 has inflection points on the image-side surface 352 thereof. The fifth lens element 350 is made of plastic material and has the object-side surface 351 and the image-side surface 352 being aspheric.

The IR-cut filter 370 is made of glass, and located between the fifth lens element 350 and the image plane 360, and will not affect the focal length of the image capturing optical lens system.

The detailed optical data of the 3rd embodiment are shown in Table 5 and the aspheric surface data are shown in Table 6 below.

TABLE 5

3rd Embodiment
f = 2.05 mm, Fno = 1.80, HFOV = 35.8 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Lens 1 | 2.188 | (ASP) | 0.339 | Plastic | 1.544 | 55.9 | 3.66 |
| 2 | | −21.053 | (ASP) | −0.035 | | | | |
| 3 | Ape. Stop | Plano | | 0.188 | | | | |
| 4 | Lens 2 | 1.339 | (ASP) | 0.220 | Plastic | 1.621 | 24.4 | −5.79 |
| 5 | | 0.915 | (ASP) | 0.146 | | | | |
| 6 | Lens 3 | 5.586 | (ASP) | 0.622 | Plastic | 1.535 | 56.3 | 1.25 |
| 7 | | −0.732 | (ASP) | 0.101 | | | | |
| 8 | Lens 4 | −0.438 | (ASP) | 0.241 | Plastic | 1.607 | 26.6 | −3.12 |
| 9 | | −0.689 | (ASP) | 0.088 | | | | |

TABLE 5-continued

3rd Embodiment
f = 2.05 mm, Fno = 1.80, HFOV = 35.8 deg.

| Surface # | | Curvature Radius | | Thickness | Material | Index | Abbe # | Focallength |
|---|---|---|---|---|---|---|---|---|
| 10 | Lens 5 | 0.869 | (ASP) | 0.431 | Plastic | 1.535 | 56.3 | −13.91 |
| 11 | | 0.643 | (ASP) | 0.400 | | | | |
| 12 | IR-cut filter | Plano | | 0.150 | Glass | 1.517 | 64.2 | — |
| 13 | | Plano | | 0.299 | | | | |
| 14 | Image | Plano | | — | | | | |

Note:
Reference wavelength (d-line) is 587.6 nm.

TABLE 6

Aspheric Coefficients

| Surface # | 1 | 2 | 4 | 5 | 6 |
|---|---|---|---|---|---|
| k = | −1.8102E+00 | 0.0000E+00 | −1.5440E+01 | −4.7847E+00 | −1.3715E+01 |
| A4 = | −8.4685E−02 | −6.3913E−01 | −7.7289E−01 | −6.3632E−01 | −1.4069E−01 |
| A6 = | 5.9734E−02 | 1.1893E+00 | −2.2143E−01 | 2.7649E−01 | −9.3371E−02 |
| A8 = | −1.3787E+00 | −1.2227E+00 | 2.9409E+00 | 7.6883E−01 | −4.7246E−01 |
| A10 = | 3.6289E+00 | −4.1474E+00 | −7.0440E+00 | −1.8721E+00 | 7.8611E−01 |
| A12 = | −5.9832E+00 | 6.6457E+00 | 1.1602E+00 | −2.4339E+00 | 2.6934E+00 |
| A14 = | 3.7713E−01 | −2.0735E−03 | 1.9137E−01 | 9.3031E−01 | −8.0614E+00 |
| A16 = | | | | | −2.0434E+00 |

| Surface # | 7 | 8 | 9 | 10 | 11 |
|---|---|---|---|---|---|
| k = | −6.8231E−01 | −2.6464E+00 | −9.4681E−01 | −8.0925E+00 | −4.0782E+00 |
| A4 = | 1.5731E−01 | −8.3120E−02 | 8.5856E−01 | −4.3133E−01 | −2.7249E−01 |
| A6 = | 6.8725E−02 | −4.0543E−03 | −6.6195E−01 | 1.5008E−01 | 1.5667E−01 |
| A8 = | −3.4137E−01 | 9.8545E−01 | 4.1539E−01 | −1.7635E−02 | −6.6004E−02 |
| A10 = | −1.5004E−01 | −1.9948E+00 | 3.0094E−01 | −1.8826E−02 | −6.6467E−03 |
| A12 = | 1.6964E+00 | 1.0330E+00 | −2.7831E−01 | −2.1896E−02 | 1.0562E−02 |
| A14 = | −1.5379E+00 | 1.8927E+00 | −1.4750E−01 | 2.6422E−02 | −1.2984E−03 |
| A16 = | | −1.6945E+00 | 3.1661E−01 | 6.7671E−03 | |

In the image capturing optical lens system according to the 3rd embodiment, the definitions of f, Fno, HFOV, V2, V4, T12, CT2, CT3, CT4, CT5, ΣCT, Td, R3, R5, R6, R7, R8, R9, R10, f1, f3, f4, f5, EPD and Yc1 are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 2.05 | R7/R6 | 0.60 |
| Fno | 1.80 | \|(R7 − R8)/(R7 + R8)\| + \|(R9 − R10)/(R9 + R10)\| | 0.37 |
| HFOV (deg.) | 35.8 | R9/f | 0.42 |
| (V2 + V4)/2 | 25.50 | f3/f1 | 0.34 |
| T12/CT2 | 0.70 | f4/f5 | 0.22 |
| CT5/CT4 | 1.79 | (f/f1 − f/f5)/(f/f3) | 0.43 |
| ΣCT/Td | 0.79 | f/EPD | 1.80 |
| f/R3 | 1.53 | Yc52/CT3 | 1.50 |
| (R5 + R6)/(R5 − R6) | 0.77 | | |

4th Embodiment

Figure 7:
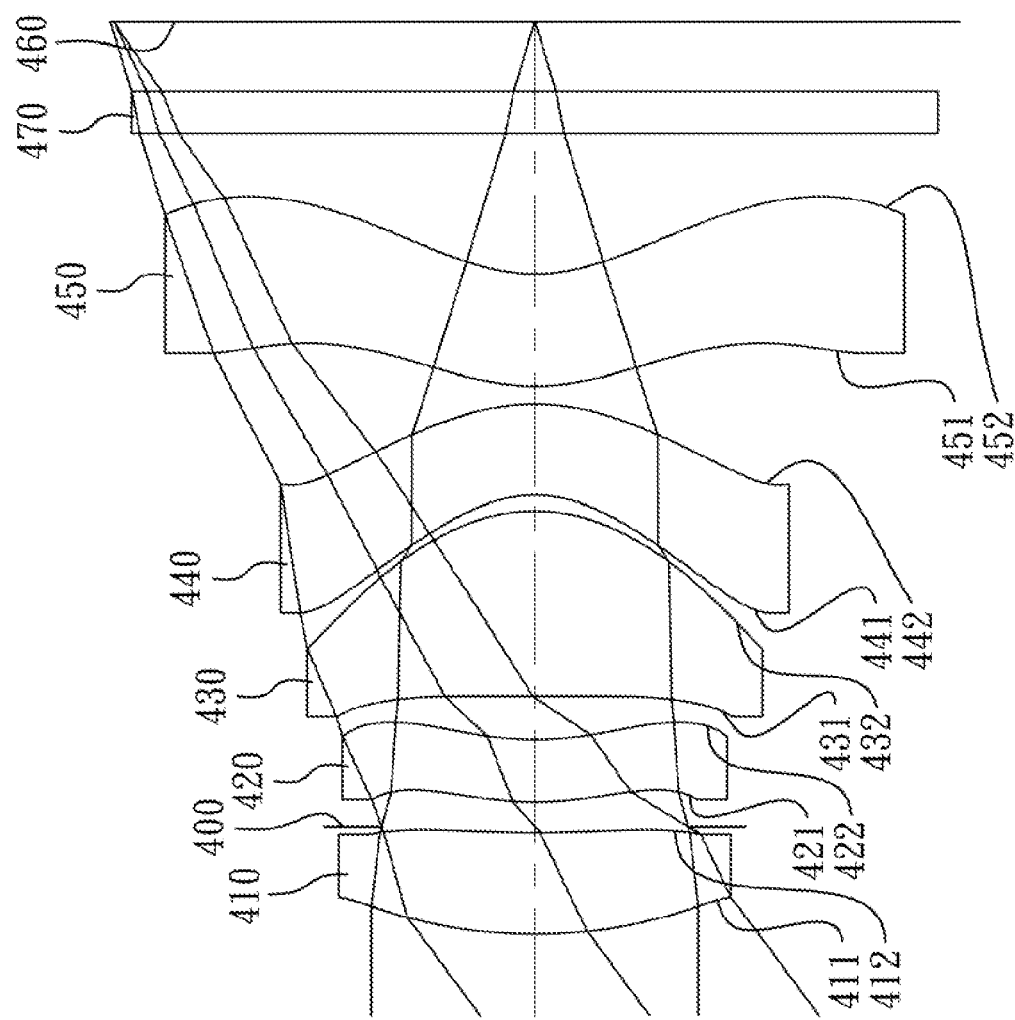
FIG. 7 is a schematic view of an image capturing optical lens system according to the 4th embodiment of the present disclosure.
Figure 8:
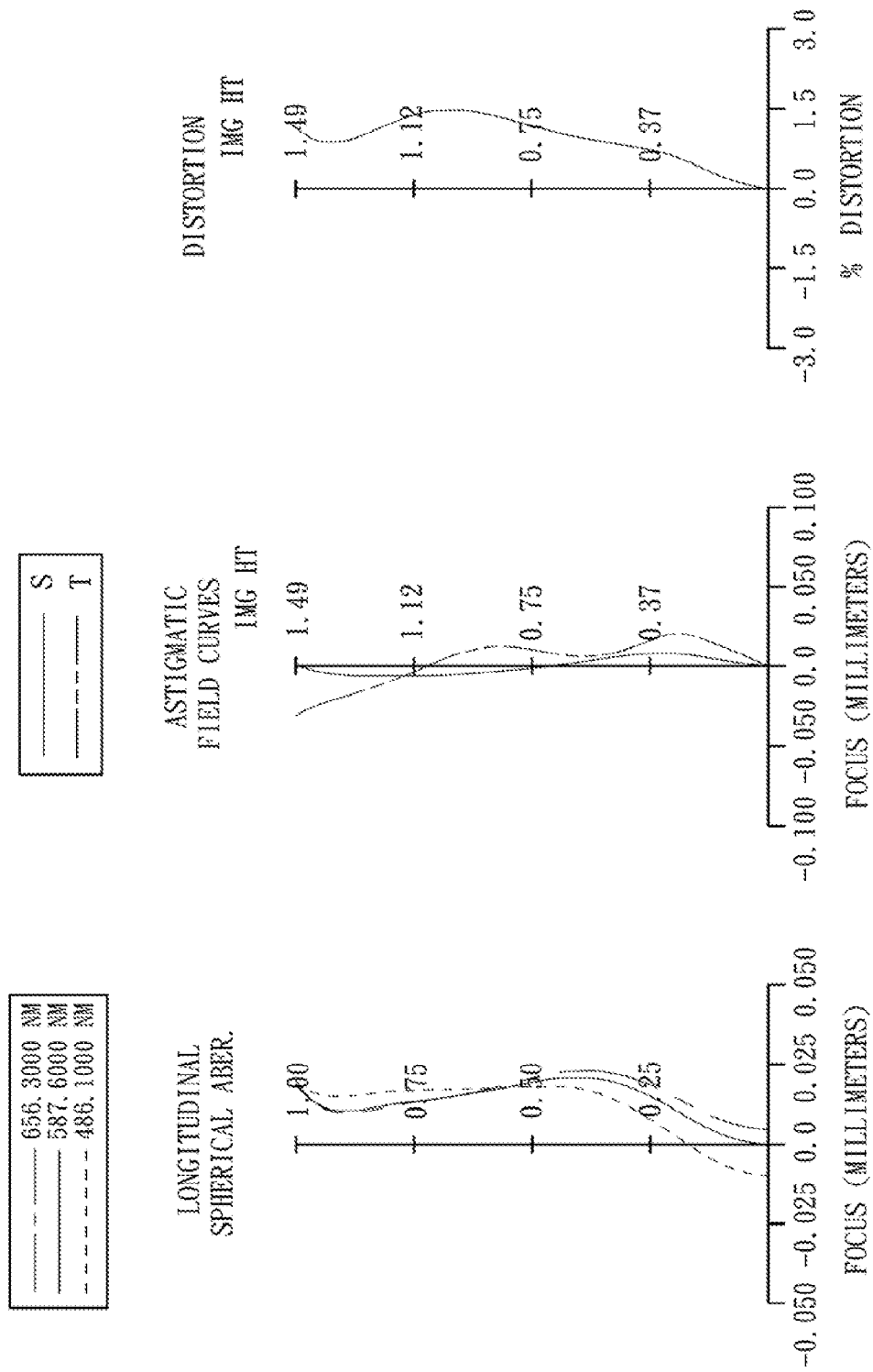
FIG. 8 shows spherical aberration curves, astigmatic field curves and a distortion curve of the image capturing optical lens system according to the 4th embodiment.

FIG. 7 is a schematic view of an image capturing optical lens system according to the 4th embodiment of the present disclosure. FIG. 8 shows spherical aberration curves, astigmatic field curves and a distortion curve of the image capturing optical lens system according to the 4th embodiment. In FIG. 7, the image capturing optical lens system includes, in order from an object side to an image side, a first lens element 410, an aperture stop 400, a second lens element 420, a third lens element 430, a fourth lens element 440, a fifth lens element 450, an IR-cut filter 470 and an image plane 460.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with positive refractive power has convex object-side surface 421 and a concave image-side surface 422, wherein the image-side surface 422 of the second lens element 420 changes from concave near an optical axis to convex away from the optical axis. The second lens element 420 is made of plastic material and has the object-side surface 421 and the image-side surface 422 being aspheric.

The third lens element 430 with positive refractive power has a convex object-side surface 431 and a convex image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442. The fourth lens element 440 is made of plastic material and has the object-side surface 441 and the image-side surface 442 being aspheric.

The fifth lens element 450 with negative refractive power has a convex object-side surface 451 and a concave image-side surface 452, wherein the object-side surface 451 of the fifth lens element 450 changes from convex near the optical axis to concave away from the optical axis, and the fifth lens element 450 has inflection points on the image-side surface 452 thereof. The fifth lens element 450 is made of plastic material and has the object-side surface 451 and the image-side surface 452 being aspheric.

The IR-cut filter 470 is made of glass, and located between the fifth lens element 450 and the image plane 460, and will not affect the focal length of the image capturing optical lens system.

The detailed optical data of the 4th embodiment are shown in Table 7 and the aspheric surface data are shown in Table 8 below.

TABLE 7

4th Embodiment
f = 1.98 mm, Fno = 1.70, HFOV = 36.7 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Lens 1 | 1.749 | (ASP) | 0.362 | Plastic | 1.544 | 55.9 | 6.37 |
| 2 | | 3.276 | (ASP) | 0.022 | | | | |
| 3 | Ape. Stop | Plano | | 0.087 | | | | |
| 4 | Lens 2 | 1.061 | (ASP) | 0.220 | Plastic | 1.640 | 23.3 | 30.80 |
| 5 | | 1.031 | (ASP) | 0.156 | | | | |
| 6 | Lens 3 | 33.302 | (ASP) | 0.659 | Plastic | 1.544 | 55.9 | 1.12 |
| 7 | | −0.614 | (ASP) | 0.057 | | | | |
| 8 | Lens 4 | −0.428 | (ASP) | 0.324 | Plastic | 1.640 | 23.3 | −2.45 |
| 9 | | −0.763 | (ASP) | 0.063 | | | | |
| 10 | Lens 5 | 0.774 | (ASP) | 0.400 | Plastic | 1.535 | 56.3 | −37.32 |
| 11 | | 0.611 | (ASP) | 0.500 | | | | |
| 12 | IR-cut filter | Plano | | 0.150 | Glass | 1.517 | 64.2 | — |
| 13 | | Plano | | 0.244 | | | | |
| 14 | Image | Plano | | — | | | | |

Note:
Reference wavelength (d-line) is 587.6 nm.

TABLE 8

Aspheric Coefficients

| Surface # | 1 | 2 | 4 | 5 | 6 |
|---|---|---|---|---|---|
| k = | 1.1642E+00 | −1.8746E+01 | −9.1517E+00 | −2.5144E+00 | −1.0000E+00 |
| A4 = | −3.7894E−02 | −7.9270E−01 | −6.4666E−01 | −7.7576E−01 | −1.9471E−01 |
| A6 = | 2.5211E−01 | 2.3430E+00 | −6.4031E−01 | −2.1794E−01 | −1.6036E−01 |
| A8 = | −1.4427E+00 | −3.9239E+00 | 2.0725E+00 | 9.5646E−01 | −1.2069E+00 |
| A10 = | 4.3955E+00 | −1.9397E+00 | −7.7988E+00 | −8.8081E−01 | 2.8182E+00 |
| A12 = | −6.0522E+00 | 6.5976E+00 | 1.0850E+00 | −2.3421E+00 | 2.7789E+00 |
| A14 = | 8.1112E−02 | −1.4520E−01 | 1.5401E−01 | 9.7944E−01 | −7.9853E+00 |
| A16 = | | | | | −1.9312E+00 |

| Surface # | 7 | 8 | 9 | 10 | 11 |
|---|---|---|---|---|---|
| k = | −7.5294E−01 | −2.4188E+00 | −8.1257E−01 | −5.2411E+00 | −3.4847E+00 |
| A4 = | 2.5035E−01 | −1.4215E−01 | 5.8856E−01 | −2.5470E−01 | −2.2366E−01 |
| A6 = | 7.0897E−02 | −6.7551E−02 | −5.9614E−01 | 7.8537E−03 | 1.0360E−01 |
| A8 = | −4.8442E−01 | 1.0959E+00 | 3.6856E−01 | 2.3201E−02 | −5.1852E−02 |
| A10 = | −6.4993E−02 | −1.8087E+00 | 2.7204E−01 | 4.1871E−02 | 1.4131E−02 |
| A12 = | 2.1259E+00 | 1.1813E+00 | −1.5575E−01 | −1.8492E−02 | −2.5508E−03 |
| A14 = | −1.5303E+00 | 1.8265E+00 | −1.0132E−01 | −3.1420E−03 | 6.6838E−04 |
| A16 = | | −1.9756E+00 | 1.5568E−01 | 1.9433E−03 | |

In the image capturing optical lens system according to the 4th embodiment, the definitions of f, Fno, HFOV, V2, V4, T12, CT2, CT3, CT4, CT5, ΣCT, Td, R3, R5, R6, R7, R8, R9, R10, f1, f3, f4, f5, EPD and Yc1 are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 1.98 | R7/R6 | 0.70 |
| Fno | 1.70 | \|(R7 − R8)/(R7 + R8)\| + \|(R9 − R10)/(R9 + R10)\| | 0.40 |
| HFOV (deg.) | 36.7 | R9/f | 0.39 |
| (V2 + V4)/2 | 23.30 | f3/f1 | 0.18 |
| T12/CT2 | 0.50 | f4/f5 | 0.07 |
| CT5/CT4 | 1.23 | (f/f1 − f/f5)/(f/f3) | 0.21 |
| ΣCT/Td | 0.84 | f/EPD | 1.70 |
| f/R3 | 1.86 | Yc52/CT3 | 1.54 |
| (R5 + R6)/(R5 − R6) | 0.96 | | |

5th Embodiment

Figure 9:
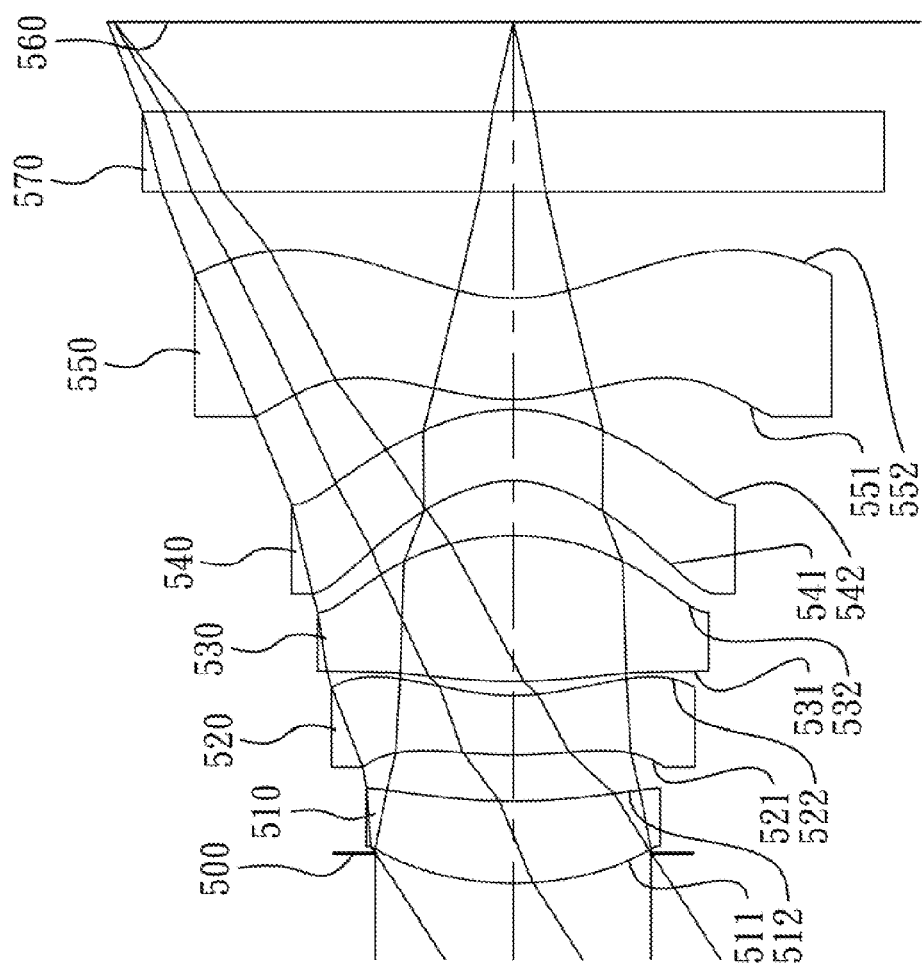
FIG. 9 is a schematic view of an image capturing optical lens system to according to the 5th embodiment of the present disclosure.
Figure 10:
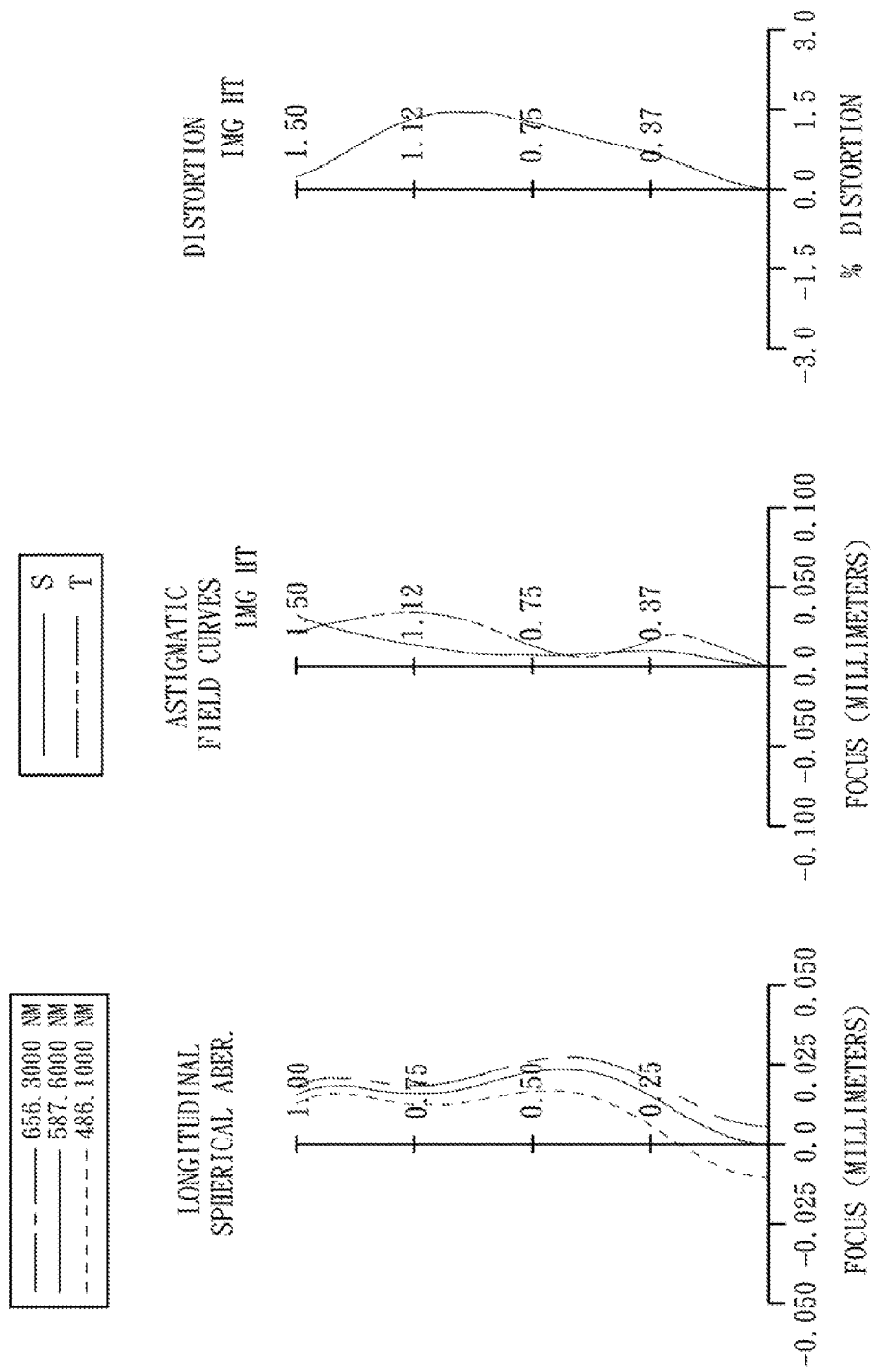
FIG. 10 shows spherical aberration curves, astigmatic field curves and a distortion curve of the image capturing optical lens system according to the 5th embodiment.

FIG. 9 is a schematic view of an image capturing optical lens system according to the 5th embodiment of the present disclosure. FIG. 10 shows spherical aberration curves, astigmatic field curves and a distortion curve of the image capturing optical lens system according to the 5th embodiment. In FIG. 9, the image capturing optical lens system includes, in order from an object side to an image side, an aperture stop 500, a first lens element 510, a second lens element 520, a third lens element 530, a fourth lens element 540, a fifth lens element 550, an IR-cut filter 570 and an image plane 560.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a convex object-side surface 521 and a concave image-side surface 522, wherein the image-side surface 522 of the second lens element 520 changes from concave near an optical axis to convex away from the optical axis. The second lens element 520 is made of plastic material and has the object-side surface 521 and the image-side surface 522 being aspheric.

The third lens element 530 with positive refractive power has a convex object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with negative refractive power has a convex object-side surface 551 and a concave image-side surface 552, wherein the object-side surface 551 of the fifth lens element 550 changes from convex near the optical axis to concave away from the optical axis, and the fifth lens element 550 has inflection points on the image-side surface 552 thereof. The fifth lens element 550 is made of plastic material and has the object-side surface 551 and the image-side surface 552 being aspheric.

The IR-cut filter 570 is made of glass, and located between the fifth lens element 550 and the image plane 560, and will not affect the focal length of the image capturing optical lens system.

The detailed optical data of the 5th embodiment are shown in Table 9 and the aspheric surface data are shown in Table 10 below.

TABLE 9

5th Embodiment
f = 2.27 mm, Fno = 2.20, HFOV = 33.1 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Ape. Stop | Plano | | −0.115 | | | | |
| 2 | Lens 1 | 1.128 | (ASP) | 0.310 | Plastic | 1.544 | 55.9 | 3.97 |
| 3 | | 2.135 | (ASP) | 0.173 | | | | |
| 4 | Lens 2 | 1.627 | (ASP) | 0.220 | Plastic | 1.634 | 23.8 | −3.15 |
| 5 | | 0.849 | (ASP) | 0.056 | | | | |
| 6 | Lens 3 | 2.192 | (ASP) | 0.545 | Plastic | 1.544 | 55.9 | 1.30 |
| 7 | | −0.953 | (ASP) | 0.204 | | | | |
| 8 | Lens 4 | −0.448 | (ASP) | 0.269 | Plastic | 1.544 | 55.9 | −4.66 |
| 9 | | −0.659 | (ASP) | 0.038 | | | | |
| 10 | Lens 5 | 0.838 | (ASP) | 0.378 | Plastic | 1.530 | 55.8 | −20.55 |
| 11 | | 0.657 | (ASP) | 0.400 | | | | |
| 12 | IR-cut filter | Plano | | 0.300 | Glass | 1.517 | 64.2 | — |
| 13 | | Plano | | 0.334 | | | | |
| 14 | Image | Plano | | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | −1.8519E−01 | −2.5382E+01 | −2.7256E+01 | −5.2383E+00 | −1.1801E+01 |
| A4 = | −5.0087E−04 | −7.9953E−02 | −9.3106E−01 | −7.3957E−01 | −1.8012E−01 |

TABLE 10-continued

| Aspheric Coefficients | | | | | |
|---|---|---|---|---|---|
| A6 = | 6.0828E−01 | 2.4670E−01 | −3.3339E−01 | 4.3517E−01 | −4.4315E−01 |
| A8 = | −1.7697E+00 | 7.6747E−01 | 1.6954E+00 | −2.9820E−01 | 6.1118E−02 |
| A10 = | 3.4368E+00 | −6.0510E+00 | −5.2558E+00 | −1.2683E+00 | 1.3638E+00 |
| A12 = | −9.1654E−01 | 6.4154E+00 | −6.0982E+00 | −2.4740E+00 | 1.2264E+00 |
| A14 = | −5.0795E−01 | −2.0671E−01 | 2.8639E−02 | 5.5951E+00 | −1.7114E+00 |
| A16 = | | | | | −1.6660E+00 |

| Surface # | 7 | 8 | 9 | 10 | 11 |
|---|---|---|---|---|---|
| k = | −3.5884E−02 | −2.6015E+00 | −8.3984E−01 | −6.7867E+00 | −4.3335E+00 |
| A4 = | −2.2399E−01 | −4.3943E−01 | 6.0659E−01 | −5.1464E−01 | −3.2566E−01 |
| A6 = | 4.0456E−01 | −5.5463E−01 | −8.1358E−01 | 9.8498E−02 | 1.5042E−01 |
| A8 = | −7.9709E−01 | 1.8471E+00 | 3.1289E−01 | −1.2423E−01 | −5.8880E−02 |
| A10 = | 1.0187E+00 | −9.0437E−01 | 6.7970E−01 | 1.7990E−02 | 8.0608E−03 |
| A12 = | 4.0630E+00 | 1.7734E+00 | 1.3360E−01 | 1.1649E−01 | 2.9196E−03 |
| A14 = | −1.7059E+00 | 2.5663E+00 | −2.0977E−01 | 1.7476E−01 | −2.9210E−05 |
| A16 = | | −4.5309E+00 | 1.5293E−01 | −1.4170E−01 | |

In the image capturing optical lens system according to the 5th embodiment; the definitions of f, Fno, HFOV, V2, V4, T12, CT2, CT3, CT4, CT5, ΣCT, Td, R3, R5, R6, R7, R8, R9, R10, f1 f3, f4, f5, EPD and Yc1 are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 2.27 | R7/R6 | 0.47 |
| Fno | 2.20 | \|(R7 − R8)/(R7 + R8)\| + \|(R9 − R10)/(R9 + R10)\| | 0.31 |
| HFOV (deg.) | 33.1 | R9/f | 0.37 |
| (V2 + V4)/2 | 39.85 | f3/f1 | 0.33 |
| T12/CT2 | 0.79 | f4/f5 | 0.23 |
| CT5/CT4 | 1.41 | (f/f1 − f/f5)/(f/f3) | 0.39 |
| ΣCT/Td | 0.79 | f/EPD | 2.20 |
| f/R3 | 1.40 | Yc52/CT3 | 1.53 |
| (R5 + R6)/(R5 − R6) | 0.39 | | |

6th Embodiment

Figure 11:
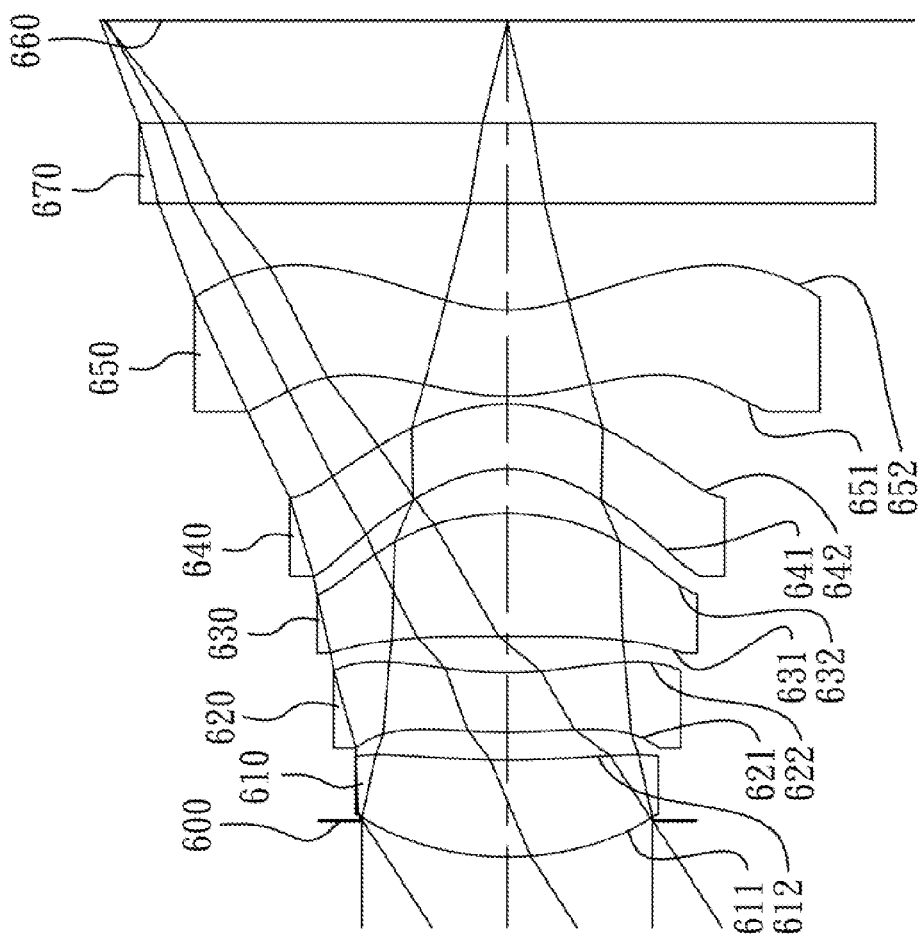
FIG. 11 is a schematic view of an image capturing optical lens system according to the 6th embodiment of the present disclosure.
Figure 12:
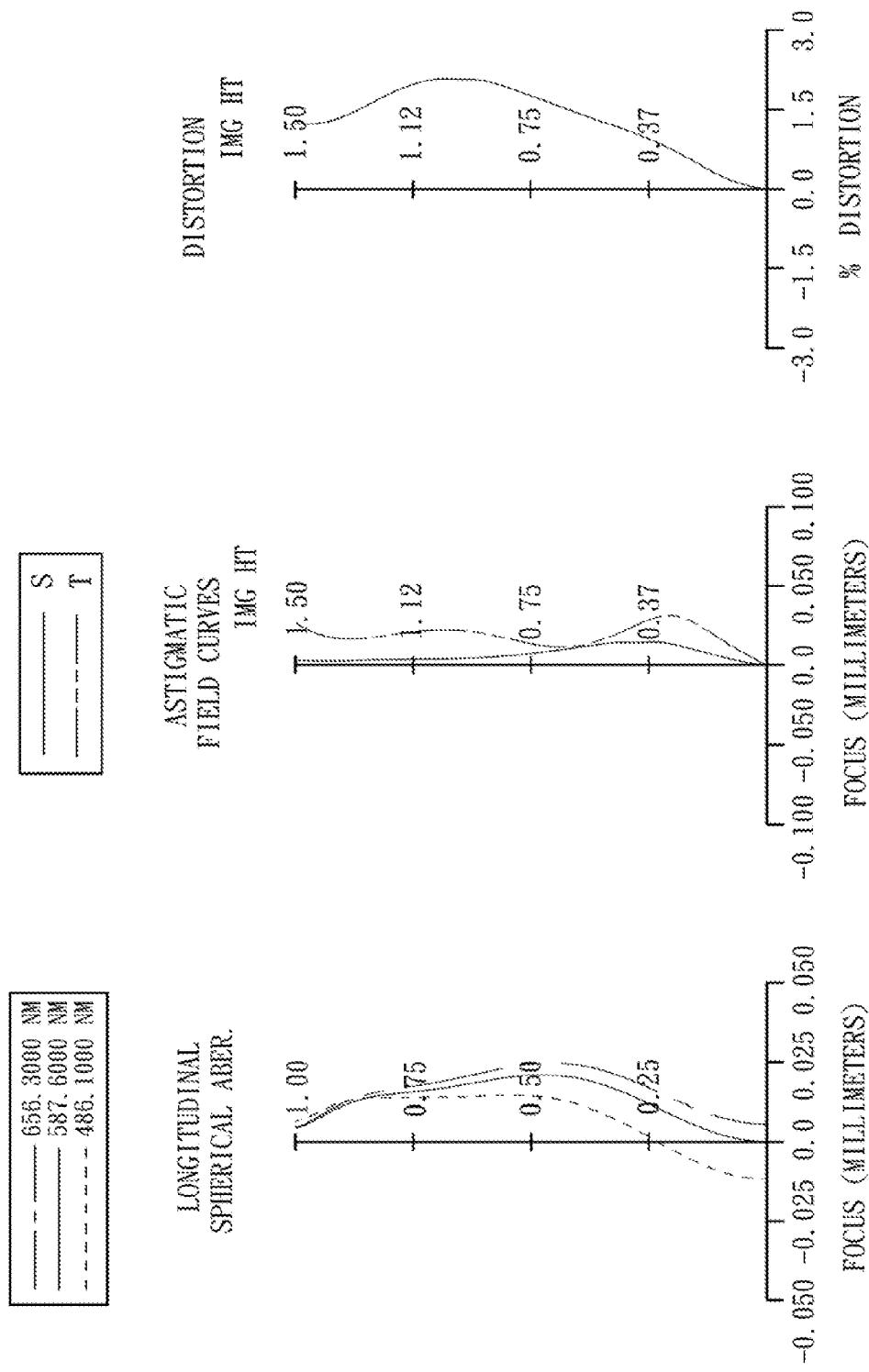
FIG. 12 shows spherical aberration curves, astigmatic field curves and a distortion curve of the image capturing optical lens system according to the 6th embodiment.

FIG. 11 is a schematic view of an image capturing optical lens system according to the 6th embodiment of the present disclosure. FIG. 12 shows spherical aberration curves, astigmatic field curves and a distortion curve of the image capturing optical lens system according to the 6th embodiment. In FIG. 11, the image capturing optical lens system includes, in order from an object side to an image side, an aperture stop 600, a first lens element 610, a second lens element 620 a third lens element 630, a fourth lens element 640 a fifth lens element 650, an IR-cut filter 670 and an image plane 660.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with negative refractive power has a convex object-side surface 621 and a concave image-side surface 622, wherein the image-side surface 622 of the second lens element 620 changes from concave near an optical axis to convex away from the optical axis. The second lens element 620 is made of plastic material and has the object-side surface 621 and the image-side surface 622 being aspheric.

The third lens element 630 with positive refractive power has a concave object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with negative refractive power has a convex object-side surface 651 and a concave image-side surface 652, wherein the object-side surface 651 of the fifth lens element 650 changes from convex near the optical axis to concave away from the optical axis, and the fifth lens element 650 has inflection points on the image-side surface 652 thereof. The fifth lens element 650 is made of plastic material and has the object-side surface 651 and the image-side surface 652 being aspheric.

The IR-cut filter 670 is made of glass, and located between the fifth lens element 650 and the image plane 660, and will not affect the focal length of the image capturing optical lens system.

The detailed optical data of the 6th embodiment are shown in Table 11 and the aspheric surface data are shown in Table 12 below.

TABLE 11

6th Embodiment
f = 2.25 mm, Fno = 2.08, HFOV = 33.1 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Ape. Stop | Plano | | −0.138 | | | | |
| 2 | Lens 1 | 1.104 | (ASP) | 0.364 | Plastic | 1.535 | 56.3 | 3.04 |
| 3 | | 3.045 | (ASP) | 0.104 | | | | |
| 4 | Lens 2 | 2.239 | (ASP) | 0.220 | Plastic | 1.634 | 23.8 | −6.47 |

TABLE 11-continued

6th Embodiment
f = 2.25 mm, Fno = 2.08, HFOV = 33.1 deg.

| Surface # | | Curvature Radius | | Thickness | Material | Index | Abbe # | Focallength |
|---|---|---|---|---|---|---|---|---|
| 5 | | 1.393 | (ASP) | 0.137 | | | | |
| 6 | Lens 3 | −13.277 | (ASP) | 0.459 | Plastic | 1.535 | 56.3 | 1.74 |
| 7 | | −0.880 | (ASP) | 0.166 | | | | |
| 8 | Lens 4 | −0.477 | (ASP) | 0.240 | Plastic | 1.614 | 25.6 | −5.88 |
| 9 | | −0.654 | (ASP) | 0.031 | | | | |
| 10 | Lens 5 | 0.824 | (ASP) | 0.320 | Plastic | 1.535 | 56.3 | −11.69 |
| 11 | | 0.629 | (ASP) | 0.400 | | | | |
| 12 | IR-cut filter | Plano | | 0.300 | Glass | 1.517 | 64.2 | — |
| 13 | | Plano | | 0.383 | | | | |
| 14 | Image | Plano | | — | | | | |

Note:
Reference wavelength (d-line) is 587.6 nm.

TABLE 12

Aspheric Coefficients

| Surface # | 2 | 3 | 4 | 5 | 6 |
|---|---|---|---|---|---|
| k = | −9.5220E−02 | −7.6454E+01 | −3.6170E+01 | −3.2324E+00 | −9.0000E+01 |
| A4 = | 1.6757E−02 | −1.7299E−01 | −8.9992E−01 | −7.7072E−01 | −1.5682E−01 |
| A6 = | 5.8194E−01 | 1.6672E−01 | −3.0767E−01 | 3.9234E−01 | −4.6353E−01 |
| A8 = | −1.7628E+00 | 6.9807E−01 | 1.5570E+00 | −2.7935E−01 | −5.7721E−05 |
| A10 = | 3.6383E+00 | −5.8876E+00 | −6.6527E+00 | −1.0855E+00 | 1.2118E+00 |
| A12 = | −9.2056E−01 | 4.3154E+00 | −3.9434E+00 | −2.2411E+00 | 1.0797E+00 |
| A14 = | −3.7861E−01 | −4.2399E+00 | 2.0224E+00 | 5.6100E+00 | −1.9151E+00 |
| A16 = | | | | | −8.7456E−01 |

| Surface # | 7 | 8 | 9 | 10 | 11 |
|---|---|---|---|---|---|
| k = | −1.1168E−01 | −2.6130E+00 | −8.4914E−01 | −7.4712E+00 | −4.6025E+00 |
| A4 = | −1.8683E−01 | −4.0075E−01 | 6.2296E−01 | −5.0002E−01 | −3.4424E−01 |
| A6 = | 4.3304E−01 | −5.3401E−01 | −8.3557E−01 | 1.0264E−01 | 1.4975E−01 |
| A8 = | −7.8460E−01 | 1.8219E+00 | 3.2282E−01 | −1.2139E−01 | −6.5869E−02 |
| A10 = | 9.8774E−01 | −9.8102E−01 | 7.1473E−01 | 1.7179E−02 | 7.9187E−03 |
| A12 = | 4.1051E+00 | 1.6827E+00 | 1.6955E−01 | 1.1484E−01 | 3.9141E−03 |
| A14 = | −1.5666E+00 | 2.4086E+00 | −1.8946E−01 | 1.7433E−01 | 6.8404E−04 |
| A16 = | | −4.7366E+00 | 1.4139E−01 | −1.4391E−01 | |

In the image capturing optical lens system according to the 6th embodiment, the definitions of f, Fno, HFOV, V2, V4, T12, CT2, CT3, CT4, CT5, ΣCT, Td, R3, R5, R6, R7, R8, R9, R10, f1, f3, f4, f5, EPD and Yc1 are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 2.25 | R7/R6 | 0.54 |
| Fno | 2.08 | \|(R7 − R8)/(R7 + R8)\| + \|(R9 − R10)/(R9 + R10)\| | 0.29 |
| HFOV (deg.) | 33.1 | R9/f | 0.37 |
| (V2 + V4)/2 | 24.70 | f3/f1 | 0.57 |
| T12/CT2 | 0.47 | f4/f5 | 0.50 |
| CT5/CT4 | 1.33 | (f/f1 − f/f5)/(f/f3) | 0.72 |
| ΣCT/Td | 0.79 | f/EPD | 2.08 |
| f/R3 | 1.01 | Yc52/CT3 | 1.71 |
| (R5 + R6)/(R5 − R6) | 1.14 | | |

7th Embodiment

Figure 13:
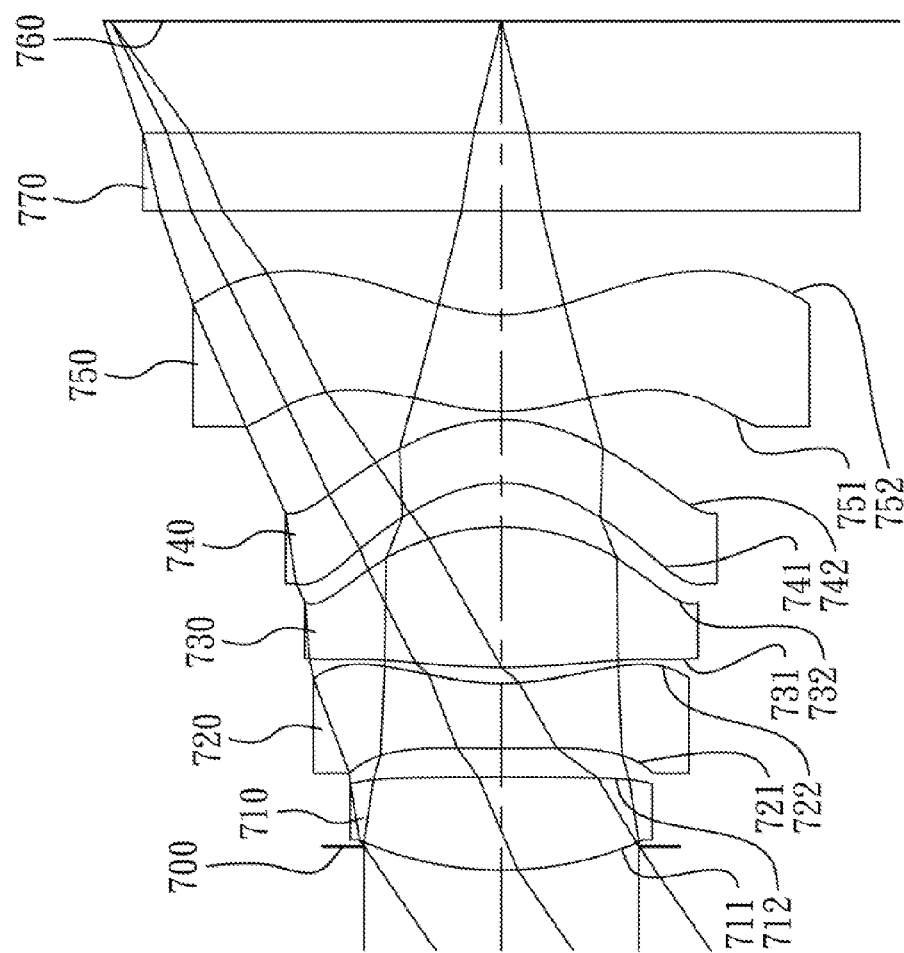
FIG. 13 is a schematic view of an image capturing optical lens system according to the 7th embodiment of the present disclosure.
Figure 14:
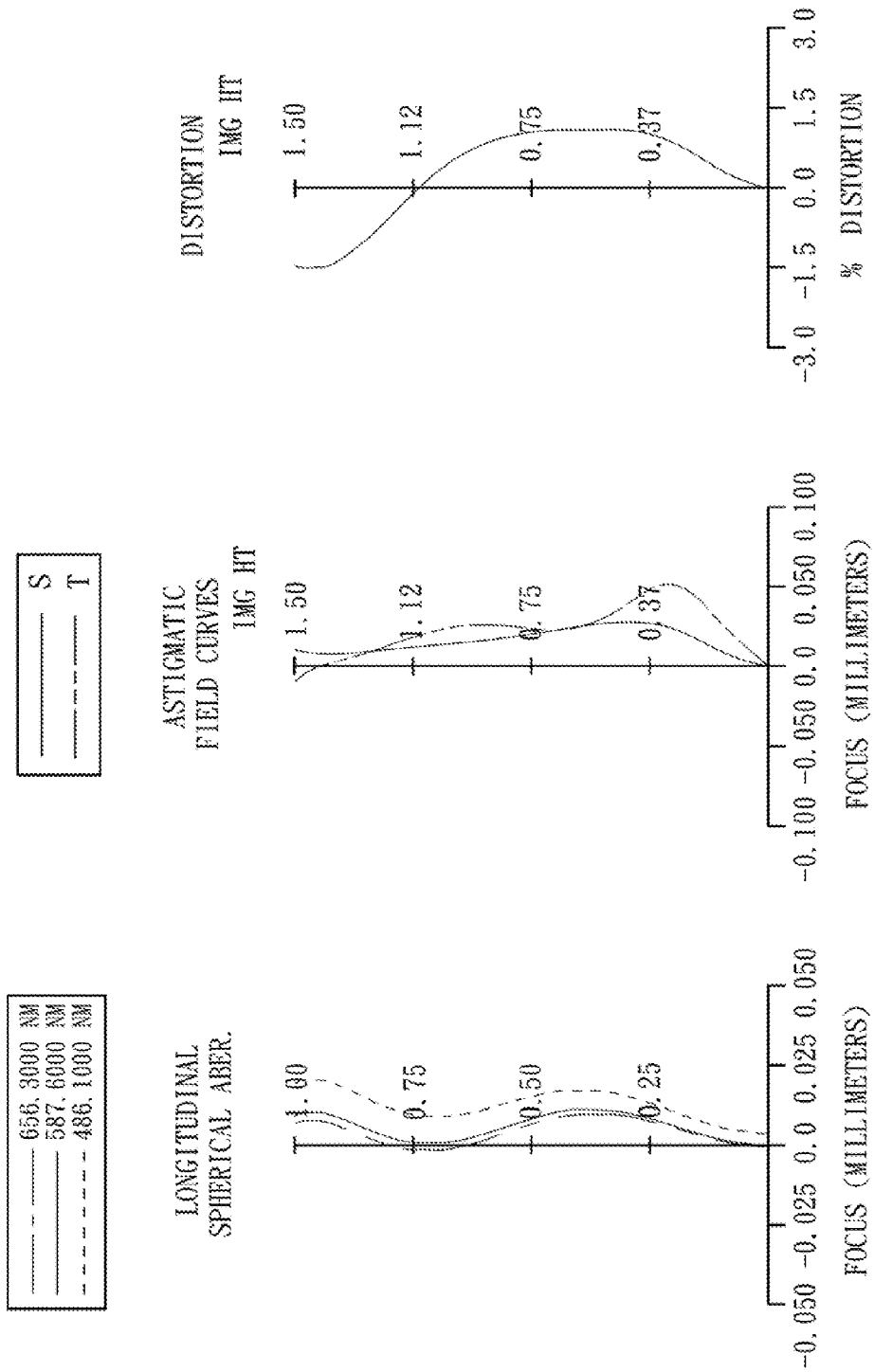
FIG. 14 shows spherical aberration curves, astigmatic field curves and a distortion curve of the image capturing optical lens system according to the 7th embodiment.

FIG. 13 is a schematic view of an image capturing optical lens system according to the 7th embodiment of the present disclosure. FIG. 14 shows spherical aberration curves, astigmatic field curves and a distortion curve of the image capturing optical lens system according to the 7th embodiment. In FIG. 13, the image capturing optical lens system includes, in order from an object side to an image side, an aperture stop 700, a first lens element 710, a second lens element 720, a third lens element 730, a fourth lens element 740, a fifth lens element 750, an IR-cut filter 770 and an image plane 760.

The first lens element 710 with positive refractive power has a convex object-side surface 711 and a convex image-side surface 712. The first lens element 710 is made of plastic material and has the object-side surface 711 and the image-side surface 712 being aspheric.

The second lens element 720 with negative refractive power has a convex object-side surface 721 and a concave image-side surface 722, wherein the image-side surface 722 of the second lens element 720 changes from concave near an optical axis to convex away from the optical axis. The second lens element 720 is made of plastic material and has the object-side surface 721 and the image-side surface 722 being aspheric.

The third lens element 730 with positive refractive power has a convex object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with negative refractive power has a convex object-side surface 751 and a concave image-side surface 752, wherein the object-side surface 751 of the fifth lens element 750 changes from convex near the optical axis to concave away from the optical axis, and the fifth lens element 750 has inflection points on the image-side surface 752 thereof. The fifth lens element 750 is made of plastic material and has the object-side surface 751 and the image-side surface 752 being aspheric.

The IR-cut filter 770 is made of glass, and located between the fifth lens element 750 and the image plane 760, and will not affect the focal length of the image capturing optical lens system.

The detailed optical data of the 7th embodiment are shown in Table 13 and the aspheric surface data are shown in Table 14 below.

In the image capturing optical lens system according to the 7th embodiment, the definitions of f, Fno, HFOV, V2, V4, T12, CT2, CT3, CT4, CT5, ΣCT, Td, R3, R5, R6, R7, R8, R9, R10, f1, f3, f4, f5, EPD and Yc1 are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 2.19 | R7/R6 | 0.52 |
| Fno | 2.08 | \|(R7 − R8)/(R7 + R8)\| + \|(R9 − R10)/(R9 + R10)\| | 0.27 |
| HFOV (deg.) | 34.7 | R9/f | 0.36 |
| (V2 + V4)/2 | 25.60 | f3/f1 | 0.52 |
| T12/CT2 | 0.44 | f4/f5 | 0.32 |
| CT5/CT4 | 154 | (f/f1 − f/f5)/(f/f3) | 0.59 |
| ΣCT/Td | 0.83 | f/EPD | 2.08 |
| f/R3 | 0.33 | Yc52/CT3 | 1.46 |
| (R5 + R6)/(R5 − R6) | 0.52 | | |

TABLE 13

7th Embodiment
f = 2.19 mm, Fno = 2.08, HFOV = 34.7 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Ape. Stop | Plano | | −0.090 | | | | |
| 2 | Lens 1 | 1.447 | (ASP) | 0.357 | Plastic | 1.535 | 56.3 | 2.58 |
| 3 | | −26.316 | (ASP) | 0.109 | | | | |
| 4 | Lens 2 | 6.729 | (ASP) | 0.250 | Plastic | 1.614 | 25.6 | −2.05 |
| 5 | | 1.045 | (ASP) | 0.060 | | | | |
| 6 | Lens 3 | 2.840 | (ASP) | 0.537 | Plastic | 1.535 | 56.3 | 1.35 |
| 7 | | −0.900 | (ASP) | 0.171 | | | | |
| 8 | Lens 4 | −0.468 | (ASP) | 0.241 | Plastic | 1.614 | 25.6 | −6.43 |
| 9 | | −0.634 | (ASP) | 0.032 | | | | |
| 10 | Lens 5 | 0.799 | (ASP) | 0.370 | Plastic | 1.535 | 56.3 | −19.89 |
| 11 | | 0.623 | (ASP) | 0.400 | | | | |
| 12 | IR-cut filter | Plano | | 0.300 | Glass | 1.517 | 64.2 | — |
| 13 | | Plano | | 0.429 | | | | |
| 14 | Image | Plano | | — | | | | |

Note:
Reference wavelength (d-line) is 587.6 nm.

TABLE 14

Aspheric Coefficients

| Surface # | 2 | 3 | 4 | 5 | 6 |
|---|---|---|---|---|---|
| k = | 1.1021E−01 | −9.0000E+01 | −4.8568E+01 | −2.1904E+00 | 5.7043E+00 |
| A4 = | 3.6833E−02 | −1.0305E−01 | −8.8163E−01 | −7.4407E−01 | −1.7243E−01 |
| A6 = | 5.0913E−01 | 1.3705E−01 | −1.2500E+00 | 3.9432E−01 | −5.1524E−01 |
| A8 = | −1.9430E+00 | 7.0195E−01 | 1.7621E+00 | −2.9107E−01 | −7.0832E−02 |
| A10 = | 3.4920E+00 | −5.6825E+00 | −7.0049E+00 | −1.1670E+00 | 1.1744E+00 |
| A12 = | −1.5607E+00 | 3.3528E+00 | −3.7523E+00 | −2.3821E+00 | 1.1980E+00 |
| A14 = | −3.5086E+00 | −6.5696E+00 | 4.2349E+00 | 5.1589E+00 | −1.4884E+00 |
| A16 = | | | | | −2.8681E−01 |

| Surface # | 7 | 8 | 9 | 10 | 11 |
|---|---|---|---|---|---|
| k = | −1.2467E−01 | −2.7527E+00 | −8.4552E−01 | −7.2524E+00 | −4.5750E+00 |
| A4 = | −1.7951E−01 | −3.7631E−01 | 6.1704E−01 | −4.9839E−01 | −3.4587E−01 |
| A6 = | 4.3087E−01 | −5.3372E−01 | −8.3217E−01 | 1.0199E−01 | 1.4597E−01 |
| A8 = | −7.8743E−01 | 1.8061E+00 | −1.2269E−01 | 3.3777E−01 | −6.3127E−02 |
| A10 = | 9.6648E−01 | −9.2855E−01 | 7.3913E−01 | 1.5334E−02 | 8.3734E−03 |
| A12 = | 4.0340E+00 | 1.9400E+00 | 1.9911E−01 | 1.1201E−01 | 4.1054E−03 |
| A14 = | −1.4727E+00 | 2.4790E+00 | −1.5818E−01 | 1.7658E−01 | 7.7480E−04 |
| A16 = | | −4.9393E+00 | 1.7033E−01 | −1.4259E−01 | |

8th Embodiment

Figure 15:
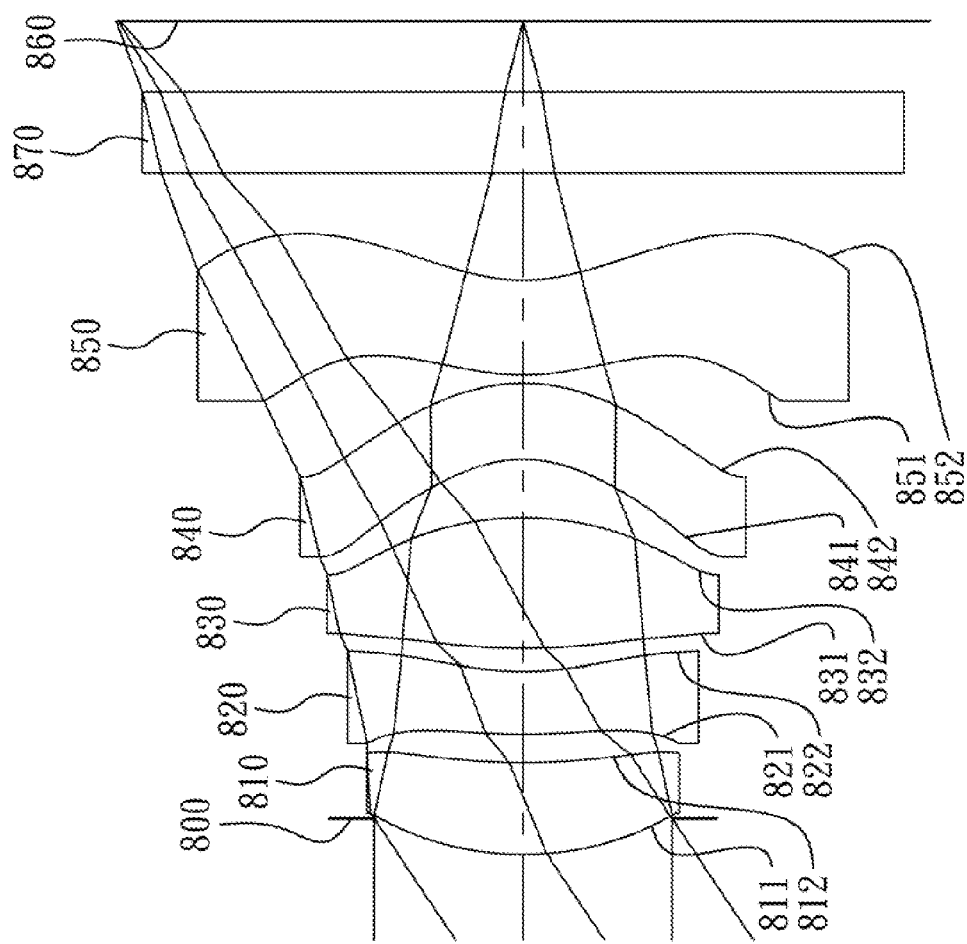
FIG. 15 is a schematic view of an image capturing optical lens system according to the 8th embodiment of the present disclosure.
Figure 16:
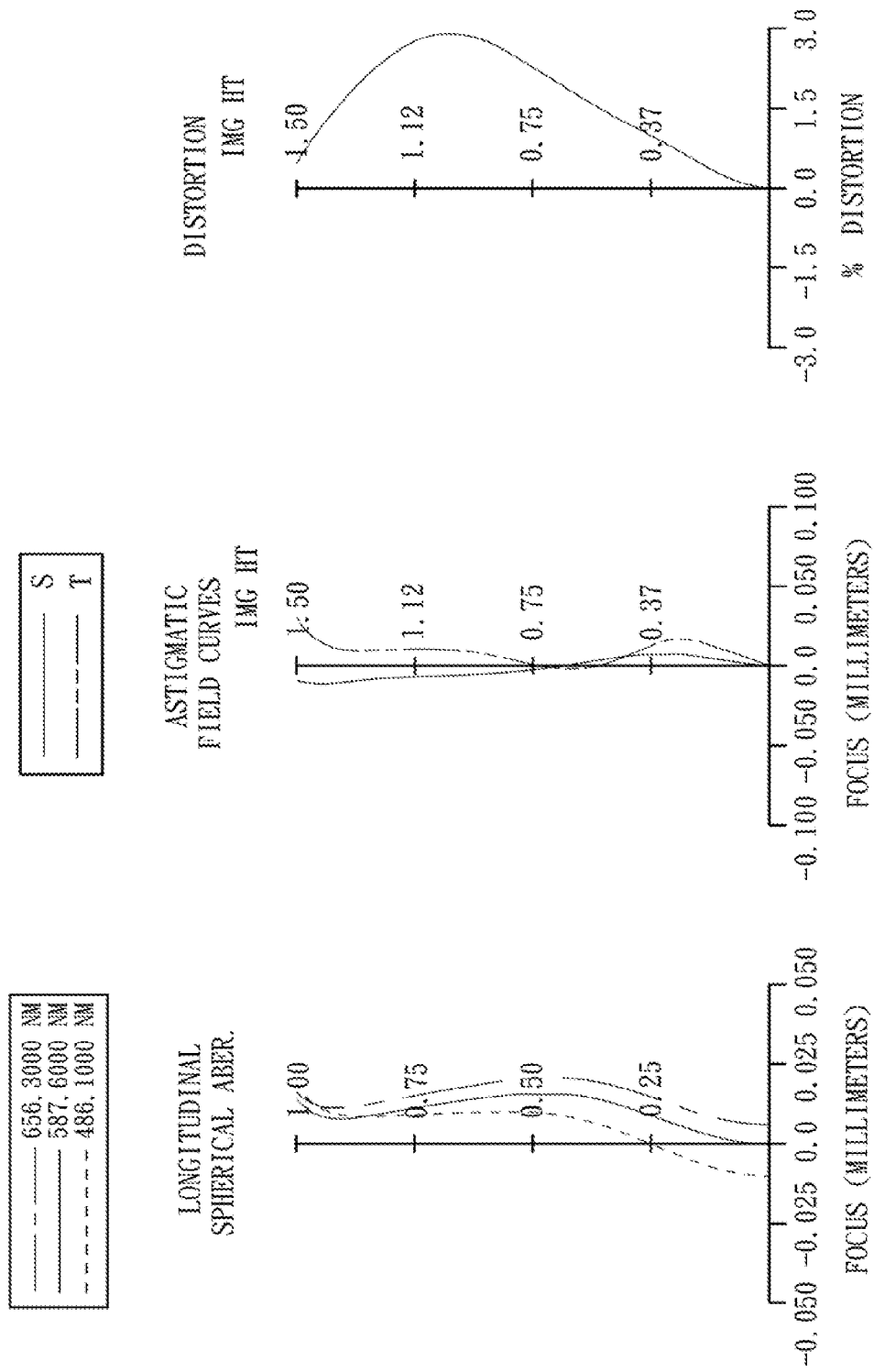
FIG. 16 shows spherical aberration curves, astigmatic field curves and a distortion curve of the image capturing optical lens system according to the 8th embodiment.

FIG. 15 is a schematic view of an image capturing optical lens system according to the 8th embodiment of the present disclosure. FIG. 16 shows spherical aberration curves, astigmatic field curves and a distortion curve of the image capturing optical lens system according to the 8th embodiment. In FIG. 15, the image capturing optical lens system includes, in order from an object side to an image side, an aperture stop 800, a first lens element 810, a second lens element 820, a third lens element 830, a fourth lens element 840, a fifth lens element 850, an IR-cut filter 870 and an image plane 860.

The first lens element 810 with positive refractive power has a convex object-side surface 811 and a concave image-side surface 812. The first lens element 810 is made of glass material and has the object-side surface 811 and the image-side surface 812 being aspheric.

The second lens element 820 with negative refractive power has a convex object-side surface 821 and a concave image-side surface 822, wherein the image-side surface 822 of the second lens element 820 changes from concave near an optical axis to convex away from the optical axis. The second lens element 820 is made of plastic material and has the object-side surface 821 and the image-side surface 822 being aspheric.

The third lens element 830 with positive refractive power has a convex object-side surface 831 and a convex image-side surface 832. The third lens element 830 is made of plastic material and has the object-side surface 831 and the image-side surface 832 being aspheric.

The fourth lens element 840 with negative refractive power has a concave object-side surface 841 and a convex image-side surface 842. The fourth lens element 840 is made of plastic material and has the object-side surface 841 and the image-side surface 842 being aspheric.

The fifth lens element 850 with negative refractive power has a convex object-side surface 851 and a concave image-side surface 852, wherein the object-side surface 851 of the fifth lens element 850 changes from convex near the optical axis to concave away from the optical axis, and the fifth lens element 850 has inflection points on the image-side surface 852 thereof. The fifth lens element 850 is made of plastic material and has the object-side surface 851 and the image-side surface 852 being aspheric.

The IR-cut filter 870 is made of glass, and located between the fifth lens element 850 and the image plane 860, and will not affect the focal length of the image capturing optical lens system.

The detailed optical data of the 8th embodiment are shown in Table 15 and the aspheric surface data are shown in Table 16 below.

TABLE 15

8th Embodiment
f = 2.20 mm, Fno = 2.00, HFOV = 33.9 deg.

| Surface # |  | Curvature Radius |  | Thickness | Material | Index | Abbe # | Focallength |
|---|---|---|---|---|---|---|---|---|
| 0 | Object | Plano |  | Infinity |  |  |  |  |
| 1 | Ape. Stop | Plano |  | −0.133 |  |  |  |  |
| 2 | Lens 1 | 1.142 | (ASP) | 0.342 | Glass | 1.603 | 42.5 | 3.47 |
| 3 |  | 2.232 | (ASP) | 0.105 |  |  |  |  |
| 4 | Lens 2 | 2.191 | (ASP) | 0.232 | Plastic | 1.650 | 21.4 | −4.23 |
| 5 |  | 1.168 | (ASP) | 0.085 |  |  |  |  |
| 6 | Lens 3 | 2.442 | (ASP) | 0.483 | Plastic | 1.535 | 56.3 | 1.52 |
| 7 |  | −1.135 | (ASP) | 0.218 |  |  |  |  |
| 8 | Lens 4 | −0.483 | (ASP) | 0.280 | Plastic | 1.614 | 25.6 | −6.73 |
| 9 |  | −0.668 | (ASP) | 0.032 |  |  |  |  |
| 10 | Lens 5 | 0.873 | (ASP) | 0.349 | Plastic | 1.530 | 55.8 | −12.45 |
| 11 |  | 0.664 | (ASP) | 0.400 |  |  |  |  |
| 12 | IR-cut filter | Plano |  | 0.300 | Glass | 1.517 | 64.2 | — |
| 13 |  | Plano |  | 0.261 |  |  |  |  |
| 14 | Image | Plano |  | — |  |  |  |  |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −2.0554E−01 | −2.0109E+01 | −1.8719E+01 | −8.6176E−01 | 8.5482E+00 |
| A4 = | 7.0555E−03 | −9.7472E−02 | −8.1067E−01 | −7.7746E−01 | −1.6269E−01 |
| A6 = | 4.4681E−01 | 1.4952E−02 | 6.1061E−02 | 3.4526E−01 | −5.8568E−01 |
| A8 = | −1.6850E+00 | 5.0558E−01 | 1.8347E−01 | −1.3118E−01 | −1.1846E+00 |
| A10 = | 3.6247E+00 | −5.2048E+00 | −8.8175E+00 | 4.1469E+00 | 1.0407E+00 |
| A12 = | −1.5178E−01 | 2.9802E+00 | −6.7636E−01 | −1.8362E+00 | 1.1692E+00 |
| A14 = | −7.2016E+00 | −7.1960E+00 | 1.4339E+01 | 5.6871E+00 | −7.3834E−01 |
| A16 = |  |  |  |  | −1.3951E+00 |

| Surface # | 7 | 8 | 9 | 10 | 11 |
|---|---|---|---|---|---|
| k = | −2.0535E−02 | −2.8049E+00 | −7.5320E−01 | −7.3875E+00 | −4.4518E+00 |
| A4 = | −3.5609E−02 | −3.0548E−01 | 5.6519E−01 | −5.4482E−01 | −3.2314E−01 |
| A6 = | 2.4850E−01 | −5.4295E−01 | −6.9580E−01 | 7.7136E−02 | 1.4110E−01 |

TABLE 16-continued

| Aspheric Coefficients | | | | | |
|---|---|---|---|---|---|
| A8 = | −8.4462E−01 | 1.7931E+00 | 4.4087E−01 | −1.1528E−01 | −6.3576E−02 |
| A10 = | 6.3342E−01 | −8.4408E−01 | 6.4118E−01 | 2.8179E−02 | 1.0014E−02 |
| A12 = | 3.0684E+00 | 1.8435E+00 | 2.6221E−02 | 1.2598E−01 | 6.7136E−03 |
| A14 = | −2.3998E−02 | 2.4085E+00 | −4.4910E−01 | 1.9310E−01 | −3.1914E−03 |
| A16 = | | −5.0153E+00 | 4.3316E−01 | −1.6614E−01 | |

In the image capturing optical lens system according to the 8th embodiment, the definitions of f, Fno, HFOV, V2, V4, T12, CT2, CT3, CT4, CT5, ΣCT, Td, R3, R5, R6, R7, R8, R9, R10, f1, f3, f4, f5, EPIC and Yc1 are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 2.20 | R7/R6 | 0.43 |
| Fno | 2.00 | \|(R7 − R8)/(R7 + R8)\| + \|(R9 − R10)/(R9 + R10)\| | 0.30 |
| HFOV (deg.) | 33.9 | R9/f | 0.40 |
| (V2 + V4)/2 | 23.50 | f3/f1 | 0.44 |
| T12/CT2 | 0.45 | f4/f5 | 0.54 |
| CT5/CT4 | 1.25 | (f/f1 − f/f5)/(f/f3) | 0.56 |
| ΣCT/Td | 0.79 | f/EPD | 2.00 |
| f/R3 | 1.01 | Yc52/CT3 | 1.69 |
| (R5 + R6)/(R5 − R6) | 0.37 | | |

9th Embodiment

Figure 17:
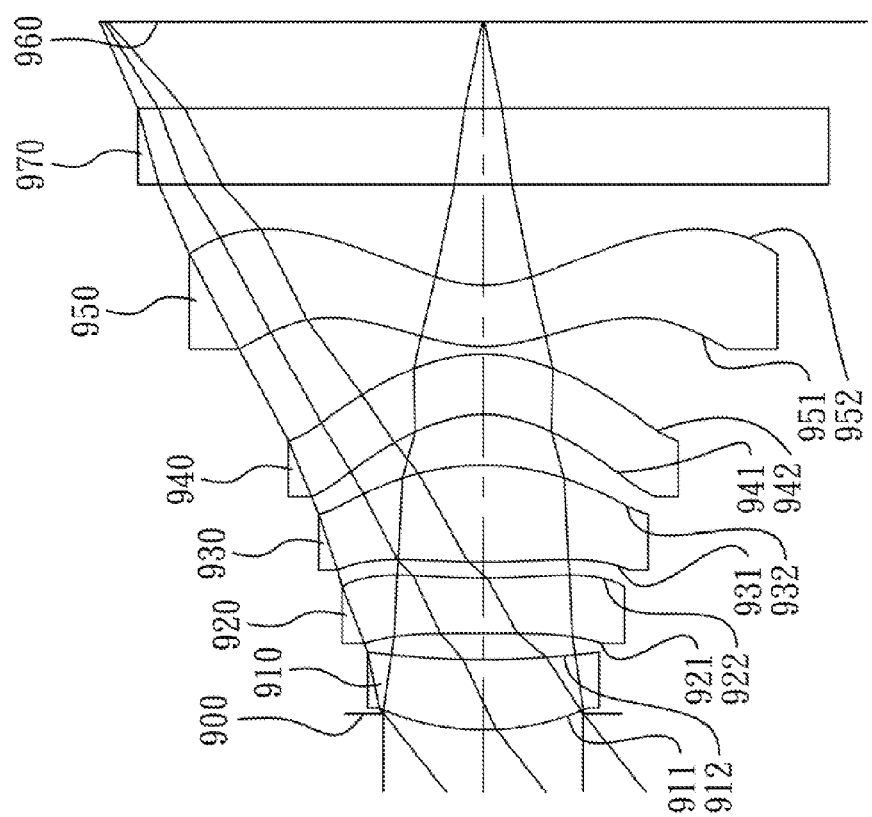
FIG. 17 is a schematic view of an image capturing optical lens system according to the 9th embodiment of the present disclosure.
Figure 18:
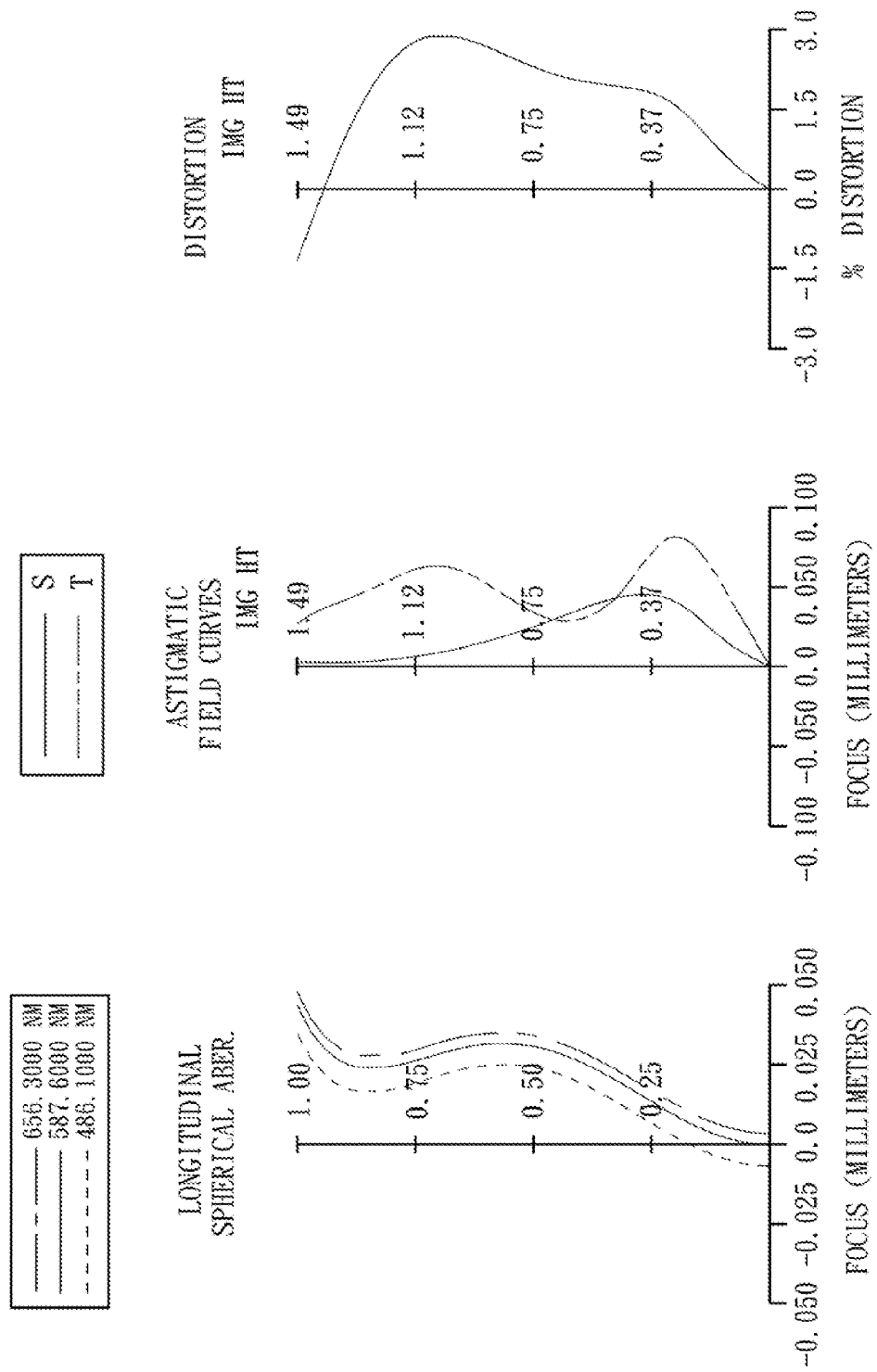
FIG. 18 shows spherical aberration curves, astigmatic field curves and a distortion curve of the image capturing optical lens system according to the 9th embodiment.

FIG. 17 is a schematic view of an image capturing optical lens system according to the 9th embodiment of the present disclosure. FIG. 18 shows spherical aberration curves, astigmatic field curves and a distortion curve of the image capturing optical lens system according to the 9th embodiment. In FIG. 17, the image capturing optical lens system includes, in order from an object side to an image side, an aperture stop 900, a first lens element 910, a second lens element 920, a third lens element 930, a fourth lens element 940, a fifth lens element 950, an IR-cut filter 970 and an image plane 960.

The first lens element 910 with positive refractive power has a convex object-side surface 911 and a concave image-side surface 912. The first lens element 910 is made of plastic material and has the object-side surface 911 and the image-side surface 912 being aspheric.

The second lens element 920 with negative refractive power has a concave object-side surface 921 and a concave image-side surface 922, wherein the image-side surface 922 of the second lens element 920 changes from concave near an optical axis to convex away from the optical axis. The second lens element 920 is made of plastic material and has the object-side surface 921 and the image-side surface 922 being aspheric.

The third lens element 930 with positive refractive power has a convex object-side surface 931 and a convex image-side surface 932. The third lens element 930 is made of plastic material and has the object-side surface 931 and the image-side surface 932 being aspheric.

The fourth lens element 940 with negative refractive power has a concave object-side surface 941 and a convex image-side surface 942. The fourth lens element 940 is made of plastic material and has the object-side surface 941 and the image-side surface 942 being aspheric.

The fifth lens element 950 with negative refractive power has a convex object-side surface 951 and a concave image-side surface 952, wherein the object-side surface 951 of the fifth lens element 950 changes from convex near the optical axis to concave away from the optical axis, and the fifth lens element 950 has inflection points on the image-side surface 952 thereof. The fifth lens element 950 is made of plastic material and has the object-side surface 951 and the image-side surface 952 being aspheric.

The IR-cut filter 970 is made of glass, and located between the fifth lens element 950 and the image plane 960, and will not affect the focal length of the image capturing optical lens system.

The detailed optical data of the 9th embodiment are shown in Table 17 and the aspheric surface data are shown in Table 18 below.

TABLE 17

9th Embodiment
f = 1.89 mm, Fno = 2.40, HFOV = 38.4 deg.

| Surface # | | Curvature Radius | | Thickness | Material | Index | Abbe # | Focallength |
|---|---|---|---|---|---|---|---|---|
| 0 | Object | Plano | | Infinity | | | | |
| 1 | Ape. Stop | Plano | | −0.065 | | | | |
| 2 | Lens 1 | 1.057 | (ASP) | 0.277 | Plastic | 1.514 | 56.8 | 2.96 |
| 3 | | 3.165 | (ASP) | 0.102 | | | | |
| 4 | Lens 2 | −40.883 | (ASP) | 0.220 | Plastic | 1.614 | 25.6 | −3.48 |
| 5 | | 2.261 | (ASP) | 0.064 | | | | |
| 6 | Lens 3 | 3.203 | (ASP) | 0.382 | Plastic | 1.535 | 56.3 | 1.51 |
| 7 | | −1.030 | (ASP) | 0.199 | | | | |
| 8 | Lens 4 | −0.485 | (ASP) | 0.240 | Plastic | 1.614 | 25.6 | −10.2 |
| 9 | | −0.622 | (ASP) | 0.030 | | | | |
| 10 | Lens 5 | 0.586 | (ASP) | 0.240 | Plastic | 1.530 | 55.8 | −17.04 |
| 11 | | 0.473 | (ASP) | 0.400 | | | | |
| 12 | IR-cut filter | Plano | | 0.300 | Glass | 1.517 | 64.2 | — |
| 13 | | Plano | | 0.343 | | | | |
| 14 | Image | Plano | | — | | | | |

Note:
Reference wavelength (d-line) is 587.6 nm.

TABLE 18

| Aspheric Coefficients | | | | | |
|---|---|---|---|---|---|
| Surface # | 2 | 3 | 4 | 5 | 6 |
| k = | 1.3182E−01 | −2.5381E+01 | −1.9405E+01 | −2.0441E+01 | −7.1686E+01 |
| A4 = | 4.2012E−02 | −3.5972E−02 | −7.8978E−01 | −8.4489E−01 | −3.9244E−01 |
| A6 = | 5.1113E−01 | 2.7515E−02 | 8.8031E−02 | 1.9961E−01 | −7.2840E−01 |
| A8 = | −1.8422E+00 | 9.4271E−01 | 1.6001E+00 | −6.2181E−01 | −2.9056E−01 |
| A10 = | 2.7855E+00 | −4.2968E+00 | −7.5918E+00 | −1.6848E+00 | 8.4784E−01 |
| A12 = | −9.8802E+00 | 7.0708E+00 | −3.3849E+00 | −3.1747E+00 | 9.1783E−01 |
| A14 = | −1.1610E+01 | 1.6109E+00 | −2.3903E+00 | 2.4239E+00 | −1.7672E+00 |
| A16 = | | | | | 3.7031E+00 |
| Surface # | 7 | 8 | 9 | 10 | 11 |
| k = | −2.4659E−01 | −3.0480E+00 | −8.6551E−01 | −6.2122E+00 | −4.2500E+00 |
| A4 = | −1.2426E−01 | −3.3370E−01 | 6.4475E−01 | −4.8907E−01 | −3.0487E−01 |
| A6 = | 4.9261E−01 | −4.8564E−01 | −8.4627E−01 | 1.1022E−01 | 1.3834E−01 |
| A8 = | −7.1571E−01 | 1.8523E+00 | 3.4763E−01 | −1.2076E−01 | −6.7214E−02 |
| A10 = | 9.5381E−01 | −8.7791E−01 | 7.8004E−01 | −7.8298E−03 | 5.7047E−03 |
| A12 = | 3.4176E+00 | 2.0027E+00 | 2.3063E−01 | 1.0663E−01 | 3.1044E−03 |
| A14 = | 1.2041E+00 | 2.5977E+00 | −1.0771E−01 | 1.6110E−01 | 3.5523E−04 |
| A16 = | | −4.7001E+00 | 2.5044E−01 | −1.2647E−01 | |

In the image capturing optical lens system according to the 9th embodiment; the definitions of f, Fno, HFOV, V2, V4, T12, CT2, CT3, CT4; CT5, ΣCT, Td, R3, R5, R6, R7, R8, R9, R10, f1, f3, f4, f5, EPD and Yc1 are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 1.89 | R7/R6 | 0.47 |
| Fno | 2.40 | \|(R7 − R8)/(R7 + R8)\| + \|(R9 − R10)/(R9 + R10)\| | 0.23 |
| HFOV (deg.) | 38.4 | R9/f | 0.31 |
| (V2 + V4)/2 | 25.60 | f3/f1 | 0.51 |
| T12/CT2 | 0.46 | f4/f5 | 0.63 |
| CT5/CT4 | 1.00 | (f/f1 − f/f5)/(f/f3) | 0.60 |
| ΣCT/Td | 0.77 | f/EPD | 2.40 |
| f/R3 | −0.05 | Yc52/CT3 | 2.21 |
| (R5 + R6)/(R5 − R6) | 0.51 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing optical lens system comprising, in order from n object side to an image side:
   a first lens element with positive refractive power having a convex object-side surface;
   a second lens element with refractive power;
   a third lens element with positive refractive power having a convex image-side surface;
   a fourth lens element with negative refractive power having a concave object-side surface and a convex image-side surface, wherein the object-side surface and the image-side surface of the fourth lens element are aspheric; and
   a fifth lens element with negative refractive power having a convex object-side surface and a concave image-side surface, wherein the object-side surface and the image-side surface of the fifth lens element are aspheric, and the fifth lens element has at least one inflection point on the image-side surface thereof;
   wherein the image capturing optical lens system has a total of five lens elements with refractive power, a focal length of the first lens element is f1, a focal length of the third lens element is f3, a focal length of the fourth lens element f4, a focal length of the fifth lens element is f5, a focal length of the image capturing optical lens system is f, a curvature radius of the object-side surface of the second lens element is R3, and the following relationships are satisfied:

$0 < f3/f1 \leq 0.57;$ $0 < f4/f5 < 1.50;$ and $-0.5 < f/R3 < 3.5.$

2. The image capturing optical lens system of claim 1, wherein a curvature radius of the image-side surface of the third lens element is R6, a curvature radius of the object-side surface of the fourth lens element is R7, and the following relationship is satisfied:

$0 < R7/R6 < 0.90.$

3. The image capturing optical lens system of claim 2, wherein a sum of the central thickness from the first through fifth lens elements is ΣCT, an axial distance between the object-side surface of the first lens element and the image-side surface of the fifth lens element is Td, aid the following relationship is satisfied:

$0.70 < \Sigma CT/Td < 0.90.$

4. The image capturing optical lens system claim 2, wherein a curvature radius of the object-side surface of the fifth lens element is R9, the focal length of the image capturing optical lens system is f, and the following relationship is satisfied:

$0.20 < R9/f < 0.60.$

5. The image capturing optical lens system of claim 2, wherein the focal length of the image capturing optical lens system is f, an entrance pupil diameter of the image capturing optical lens system is EPD, and the following relationship is satisfied:

$1.2 < f/EPD \leq 2.2.$

6. The image capturing optical lens system of claim 1, wherein the image-side surface of the second lens element changes from concave near an optical axis to convex away from the optical axis.

7. The image capturing optical lens system of claim 1, wherein a curvature radius of the object-side surface of the fourth lens element is R7, a curvature radius of the image-side surface of the fourth lens element is R8, a curvature radius of the object-side surface of the fifth lens element is R9, a curvature radius of the image-side surface of the fifth lens element is R10, and the following relationship is satisfied:

$$0.20<|(R7-R8)/(R7+R8)|+|(R9-R10)/(R9+R10)|<0.45.$$

8. The image capturing optical lens system of claim 1, wherein an Abbe number of the second lens element is V2, an Abbe number of the fourth lens element V4, and the following relationship is satisfied:

$$20<(V2+V4)/2<30.$$

9. The image capturing optical lens system of claim 1, wherein the first lens element has a concave image-side surface.

10. The image capturing optical lens system of claim 9, wherein the focal length of the first lens element is f1, the focal length of the third lens element is f3, and the following relationship is satisfied:

$$0<f3/f1<0.45.$$

11. The image capturing optical lens system of claim 9, wherein the focal length of the first lens element is f1, the focal length of the third lens element is f3, the focal length of the fifth lens element is f5, the focal length of the image capturing optical lens system is f, and the following relationship is satisfied:

$$0.20<(f/f1-f/f5)/(f/f3)<0.75.$$

12. The image capturing optical lens system of claim 9, wherein a distance between an optical axis and a non-axial critical point on the image-side surface of the fifth lens element is Yc1, a central thickness of the third lens element is CT3, and the following relationship is satisfied:

$$1.0<Yc52/CT3<3.5.$$

13. The image capturing optical lens system of claim 1 wherein the second lens element has a convex object-side surface and a concave image-side surface.

14. The image capturing optical lens system of claim 13, wherein the object-side surface of the fifth lens element changes from convex near an optical axis to concave away from the optical axis.

15. The image capturing optical lens system of claim 13, wherein a curvature radius of the object-side surface of the third lens element is R5, a curvature radius of the image-side surface of the third lens element is R6, and the following relationship is satisfied:

$$0.3<(R5+R6)/(R5-R6)<1.3.$$

16. The image capturing optical lens system of claim 1, wherein a central thickness of the fourth lens element is CT4, a central thickness of the fifth lens element CT5, and the following relationship is satisfied:

$$0.8<CT5/CT4<1.8.$$

17. The image capturing optical lens system of claim 1 wherein the focal length of the first lens element is f1 the focal length of the third lens element is f3, and the following relationship is satisfied:

$$0<f3/f1<0.35.$$

18. An image capturing optical lens system comprising, in order from an object side to an image side:
a first lens element with positive refractive power having a convex object-side surface;
a second lens element with refractive power;
a third lens element with positive refractive power having a convex image-side surface;
a fourth lens element with negative refractive power having a concave object-side surface and a convex image-side surface, wherein the object-side surface and the image-side surface of the fourth lens element are aspheric; and
a fifth lens element with negative e active power having a convex object-side surface and a concave image-side surface, wherein the object-side surface and the image-side surface of the fifth lens element are aspheric, and the fifth lens element has at least one inflection point on the image-side surface thereof;
wherein the image capturing optical lens system has a total of five lens elements with refractive power, a focal length of the first lens element is f1, a focal length of he third lens element is f3, a focal length of the fourth lens element is f4, a focal length of the fifth lens element is f5, a curvature radius of the image-side surface of the third lens element is R6, a curvature radius of the object-side surface of the fourth lens element is R7, and the following relationships are satisfied:

$$0<f3/f1\leq0.57;$$

$$0<f4/f5<1.50; \text{ and}$$

$$0<R7/R6<0.90.$$

19. The image capturing optical lens system of claim 18, wherein the first lens element has a concave image-side surface, and the second lens element has a convex object-side surface and a concave image-side surface.

20. The image capturing optical lens system of claim 18, wherein the image-side surface of the second lens element changes from concave near an optical axis to convex away from an optical axis.

21. The image capturing optical lens system of claim 18, wherein a sum of the central thickness from the first through fifth lens elements is ΣCT, an axial distance between the object-side surface of the first lens element and the image-side surface of the fifth lens element is Td, and the following relationship is satisfied:

$$0.75<\Sigma CT/Td<0.85.$$

22. The image capturing optical lens system of claim 18, wherein the focal length of the fourth lens element is f4, the focal length of the fifth lens element is f5, and the following relationship is satisfied:

$$0<f4/f5<0.70.$$

23. The image capturing optical lens system of claim 18, where in the focal length of the first lens element is f1, the focal length of the third lens element is f3, and the following relationship is satisfied:

$$0<f3/f1<0.35.$$

24. The image capturing optical lens system of claim 18, wherein an Abbe number of the second lens element is V2, an Abbe number of the fourth lens element is V4, and the following relationship is satisfied:

$$20<(V2-V4)/2<30.$$

25. The image capturing optical lens system of claim 18, wherein a focal length of the image capturing optical lens system is f, an entrance pupil diameter of the image capturing optical lens system is EPD, and the following relationship is satisfied:

$1.2 < f/EPD \leq 2.2$.

26. The image capturing optical lens system of claim 18, wherein an axial distance between the first lens element and the second lens element is T12, a central thickness of the second lens element is CT2, and the following relationship is satisfied:

$0 < T12/CT2 < 1.0$.

* * * * *

UNITED STATES PATENT AND TRADEMARK OFFICE
CERTIFICATE OF CORRECTION

PATENT NO.         : 9,036,274 B2
APPLICATION NO.    : 13/655490
DATED              : May 19, 2015
INVENTOR(S)        : Hsin-Hsuan Huang and Tsung-Han Tsai It is certified that error appears in the above-identified patent and that said Letters Patent is hereby corrected as shown below:

Claims

In column 31, line 52, Claim 1 of the issued patent reads as "An image capturing … from n object side to an image side", but it should read as "An image capturing … from an object side to an image side".
In column 32, line 28, Claim 1 of the issued patent reads as "|a focal length of the fourth lens element f4", but it should read as "a focal length of the fourth lens element is f4".
In column 32, line 50, Claim 3 of the issued patent reads as ", aid the following relationship is satisfied:", but it should read as ", and the following relationship is satisfied:".
In column 33, line 16, Claim 8 of the issued patent reads as "an Abbe number of the fourth lens element V4", but it should read as "an Abbe number of the fourth fens element is V4".
In column 33, line 39, Claim 12 of the issued patent reads as "wherein a distance … of the fifth lens element is Yc1", but it should read as "wherein a distance … of the fifth lens element is Yc52".
In column 33, line 64, Claim 17 of the issued patent reads as "…is f1 the focal length of the third lens element is f3", but it should read as "…is f1, the focal length of the third lens element is f3".
In column 34, line 12, Claim 18 of the issued patent reads as "a fifth lens element with negative e active power…", but it should read as "a fifth lens element with negative refractive power…".
In column 34, line 20, Claim 18 of the issued patent reads as "a focal length of he third lens element is f3", but it should read as "a focal length of the third lens element is f3".
In column 34, line 55, Claim 23 of the issued patent reads as "where in the focal length of the first lens element is f1", but it should read as "wherein the focal length of the first lens element is f1".
In column 34, line 64, Claim 24 of the issued patent reads as "20 < (V2-V4)/2 < 30", but it should read as "20 < (V2+V4)/2 < 30".

Signed and Sealed this
Thirteenth Day of October, 2015

Michelle K. Lee
*Director of the United States Patent and Trademark Office*